(12) United States Patent
Chu et al.

(10) Patent No.: US 10,421,843 B2
(45) Date of Patent: Sep. 24, 2019

(54) POLY(ESTER AMIDE) MACROMERS AND POLYMERS THEREOF

(75) Inventors: Chih-Chang Chu, Ithaca, NY (US); Mingxiao Deng, Jilin (CN)

(73) Assignee: Cornell University, Ithaca, NY (US)

( * ) Notice: Subject to any disclaimer, the term of this patent is extended or adjusted under 35 U.S.C. 154(b) by 387 days.

(21) Appl. No.: 13/583,426

(22) PCT Filed: Mar. 9, 2011

(86) PCT No.: PCT/US2011/027721
§ 371 (c)(1),
(2), (4) Date: Nov. 19, 2012

(87) PCT Pub. No.: WO2011/112700
PCT Pub. Date: Sep. 15, 2011

(65) Prior Publication Data
US 2013/0059998 A1    Mar. 7, 2013

Related U.S. Application Data

(60) Provisional application No. 61/311,845, filed on Mar. 9, 2010.

(51) Int. Cl.
| C08G 69/44 | (2006.01) |
| C08J 3/24 | (2006.01) |
| C08J 3/075 | (2006.01) |
| C08L 77/12 | (2006.01) |

(52) U.S. Cl.
CPC ............. *C08J 3/246* (2013.01); *C08G 69/44* (2013.01); *C08J 3/075* (2013.01); *C08L 77/12* (2013.01); *C08J 2377/12* (2013.01)

(58) Field of Classification Search
CPC .................................................. C08G 69/44
See application file for complete search history.

(56) References Cited

U.S. PATENT DOCUMENTS

| 2006/0089485 A1 | 4/2006 | DesNoyer et al. |
| 2007/0134332 A1 | 6/2007 | Turnell et al. |
| 2007/0155273 A1 | 7/2007 | Chu et al. |
| 2007/0167605 A1* | 7/2007 | Chu et al. ................... 528/310 |

(Continued)

OTHER PUBLICATIONS

Katsarava et al (Amino acid-based bioanalogous polymers. Synthesis, and study of regular poly(ester amide)s based on bis(α-amino acid) α,ω-alkylene diesters, and aliphatic dicarboxylic acids. J. Polym. Sci. A Polym. Chem., 37: 391-407).*

*Primary Examiner* — Rachel Kahn
(74) *Attorney, Agent, or Firm* — Hodgson Russ LLP

(57) ABSTRACT

Amino acid-based poly(ester amide) (PEA) macromers (e.g., functional PEA macromers) and methods for preparing amino acid-based poly(ester amide) (PEA) macromers. The functional PEA macromers can comprise functional groups such as hydroxyl, amine, sulfonic acids, carboxyl, thiol and acryloyl at the two terminuses of the PEA macromers. The content of the terminal functional groups on the macromers can be precisely controlled by adjusting the molar ratio of reactive monomers. The resulting versatility of these new functional PEA macromers can be used to fabricate a wide range of PEAs and PEA hybrid derivatives with very different chemical, physical, mechanical, thermal and biological properties. The functional PEA macromers can also be polycondensed into forming block PEA polymers.

3 Claims, 23 Drawing Sheets

(56) References Cited

U.S. PATENT DOCUMENTS

| | | |
|---|---|---|
| 2007/0282011 A1* | 12/2007 | Gomurashvili et al. ...... 514/687 |
| 2007/0287987 A1 | 12/2007 | Katsarava et al. |
| 2008/0299174 A1 | 12/2008 | Gomurashvili et al. |
| 2009/0022772 A1 | 1/2009 | Carpenter et al. |

* cited by examiner

Macromer 1.2

Higher molecular weight PEA homopolymer

Higher molecular weight PEA copolymer

POLY(ESTER AMIDE) MACROMERS AND POLYMERS THEREOF

CROSS-REFERENCE TO RELATED APPLICATIONS

This application claims priority to U.S. provisional patent application No. 61/311,845, filed Mar. 9, 2010, the disclosure of which is incorporated herein by reference.

FIELD OF THE INVENTION

The present invention generally relates to poly(ester amide) (PEA) based-macromers and polymers of PEA-based macromers. More particularly, the present invention relates to poly(ester amide) macromers and methods of making and using such macromers and polymers.

BACKGROUND OF THE INVENTION

Amino acid-based biodegradable PEAs have been studied for many years due to their biocompatibility, biodegradability and mechanical properties. The presence of amide and ester bonds in PEA furnishes the PEA with a combination of properties typically exhibited by either polyesters or polyamides. Biodegradable PEA is typically synthesized by a solution polycondensation reaction of a-amino acids, aliphatic dicarboxylic acids (or dichloride of dicarboxylic acids) and diols (see Guo et al., *Journal of Polymer Science, Part A: Polymer Chemistry* 2007, 45(9): 1595-1606).

PEA homopolymers generally do not have any functional groups located either along the PEA backbone chain or as pendant groups. The first reported synthesis of functional PEAs was based on a copolymer approach. A free functional group in the form of a carboxylic acid group was introduced in the lysine segment of the PEA copolymer. (See, Jokhadze et al., *Journal of Biomaterials Science—Polymer Edition* 2007; 18(4):411-438.) In another approach, carbon-to-carbon double bonds have been positioned along the backbone of PEA to provide a reactive site for the introduction of a functional group into PEA via unsaturated diacids and/or diols.

Delivery of desired biomolecules to cells can be accomplished by various delivery means that generally fall into 4 broad categories: water soluble cationic polymers, lipids, dendrimers and nanoparticles. Among them, the water soluble synthetic and natural polycations have attracted the most attention. A large number of cationic polymers have been tested for gene delivery. Among them, poly-L-lysine (PLL) and polyethylenimine (PEI) have been intensively studied because of their strong interaction with the plasmid DNA which results in formation of a compact polymer/DNA complex. Other synthetic and natural polycations developed as non-viral vectors includes polyamidoamine dendrimers and chitosan, imidazole-containing polymers with proton-sponge effect, membrane-disruptive peptides and polymers like polyethylacrylic acid (PEAA), poly [alpha-(4-aminobutyl)-L-glycolic acid] (PAGA), and poly (amino acid) based materials. However, most of them could not achieve both high transfection efficiency and low toxicity.

BRIEF SUMMARY OF THE INVENTION

In an aspect, the present invention provides PEA macromers having the following structure:

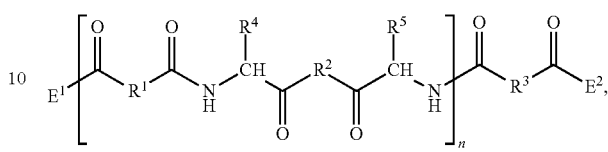

where $R^1$ at each occurrence in the macromer is independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^2$ at each occurrence in the macromer is independently selected from a $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_2$ to $C_{20}$ alkylene diol group and $C_4$ to $C_{20}$ alkylene ether group, $R^4$ and $R^5$ at each occurrence in the macromer are independently a side-group of a naturally occurring amino acid or non-naturally occurring amino acid, $E^1$ and $E^2$ are each independently an end group, and n is an integer from 1 to 20.

In an aspect, the present invention provides a method for making a poly(ester amide) polymer comprising the steps of: a) mixing a first macromer having the following structure:

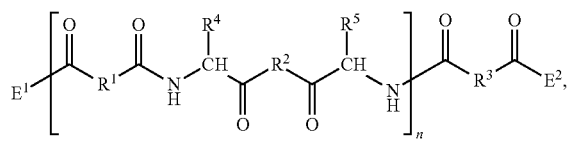

where $E^1$ and $E^2$ are each an —NHCH$_2$COOH, or an —NH-alkyl ($C_2$-$C_{10}$) COOH group, and a second macromer having the following structure:

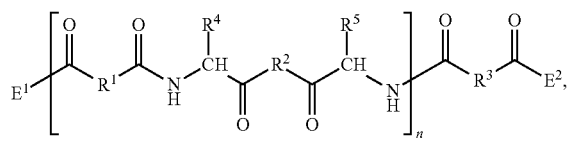

where $E^1$ and $E^2$ are an —NH-alkyl ($C_2$-$C_{10}$) amino group or an —NH-alkyl ($C_2$-$C_{10}$) hydroxyl group, in a ratio of first macromer:second macromer of, for example, 0.5:1 to 2:1, and optionally, a solvent; and b) mixing the mixture from a) with a dehydrating agent until polymerization has proceeded to the desired extent. In an embodiment, the present invention provides polymers made by this method.

In an aspect, the present invention provides a poly(ester amide) polymer having the following structure:

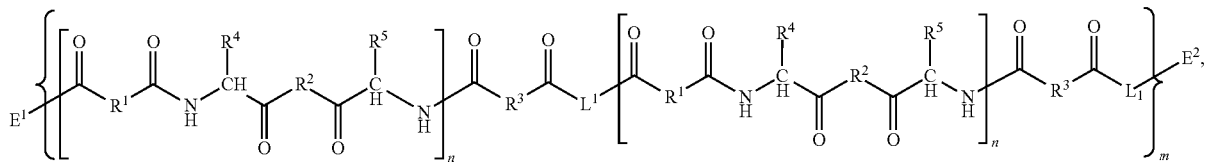

where n at each occurrence in the polymer is an integer from 1 to 20, and m is an integer from 2 to 100. In various embodiments, a poly(ester amide) polymer has one the following structures:

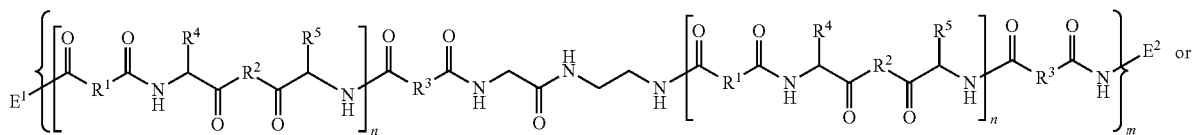

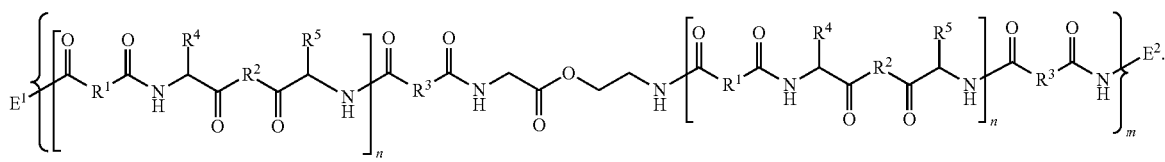

In an aspect, the present invention provides a macromer having the following structure:

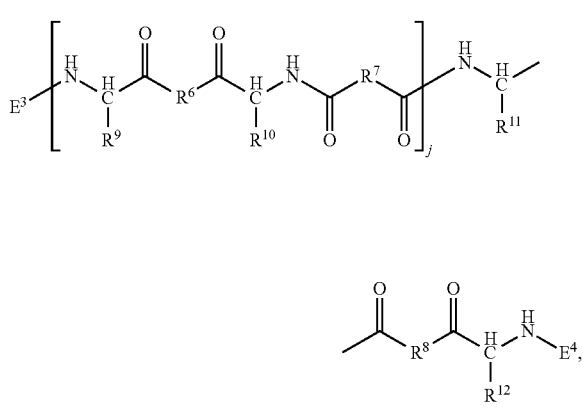

where $R^6$ at each occurrence in the macromer are independently selected from a $C_1$ to $C_{20}$ alkylene diol group and $C_4$ to $C_{20}$ alkylene ether group, $R^7$ at each occurrence in the macromer is selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^8$ is selected from a $C_1$ to $C_{20}$ alkylene diol group and $C_4$ to $C_{20}$ alkylene ether group, $R^9$ and $R^{10}$ at each occurrence in the macromer are independently a side-group of a naturally occurring amino acid or a non-naturally occurring amino acid, $R^{11}$ and $R^{12}$ are each independently a side-group of a naturally occurring amino acid or a non-naturally occurring amino acid, $E^3$ and $E^4$ are each independently an end group, and j is an integer from 1 to 20.

In an embodiment, a macromer has the following structure:

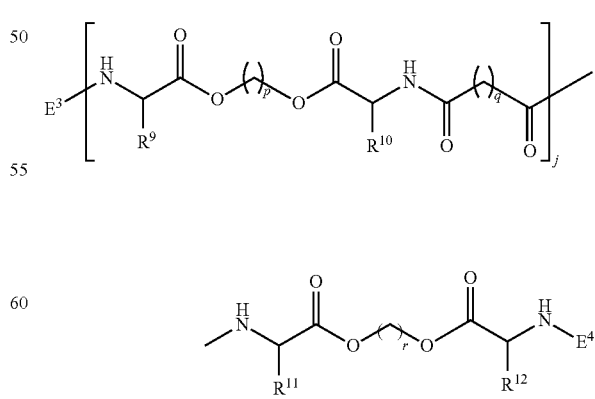

where p is an integer from 1 to 20, q is an integer from 1 to 20, and r is an integer from 1 to 20.

In an aspect, the present invention provides a poly(ester amide) copolymer having the following structure:

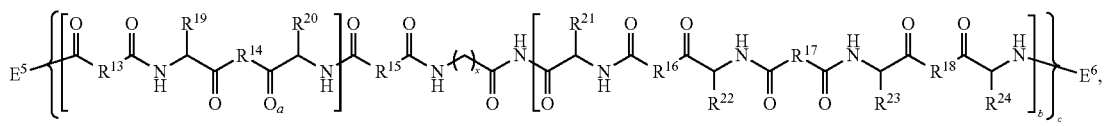

where $R^{13}$, $R^{15}$, and $R^{17}$ at each occurrence in the polymer are independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^{14}$, $R^{16}$, and $R^{18}$ at each occurrence in the polymer are independently selected from a $C_1$ to $C_{20}$ alkylene diol group and $C_4$ to $C_{20}$ alkylene ether group, $R^{19}$, $R^{20}$, $R^{21}$, $R^{22}$, $R^{23}$, and $R^{24}$ at each occurrence in the polymer are independently a side-group of a naturally occurring amino acid or a non-naturally occurring amino acid, $E^5$ and $E^6$ are each independently an end group, a at each occurrence in the polymer is an integer from 1 to 20, b at each occurrence in the polymer is an integer from 1 to 20, c is an integer from 2 to 100, and x is 1-10.

In an aspect, the present invention provides a composition comprising a macromer or polymer as disclosed herein. In an embodiment, a composition is a hydrogel or gel. For example, a hydrogel or gel is formed by photochemical reaction of a macromer or polymer disclosed herein and a gel-forming compound (e.g., PEG-DA). In an embodiment, the composition further comprises a drug, a biological agent, nutrient, peptide, polynucleotide, or a combination thereof.

Figure 16:
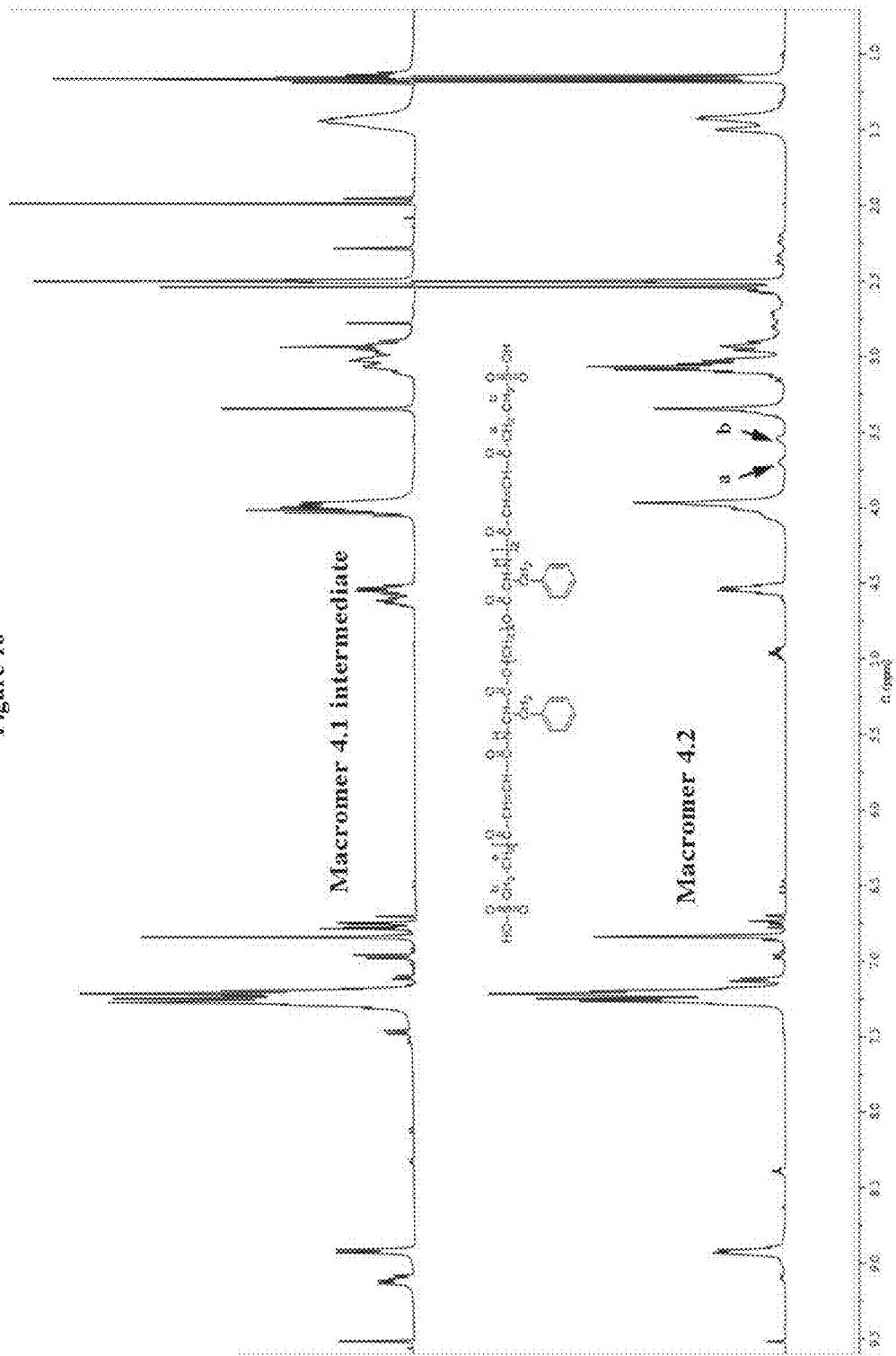

FIG. 16. $^1$H NMR spectra of Macromer 4.1 and Macromer 4.2.

Figure 17:
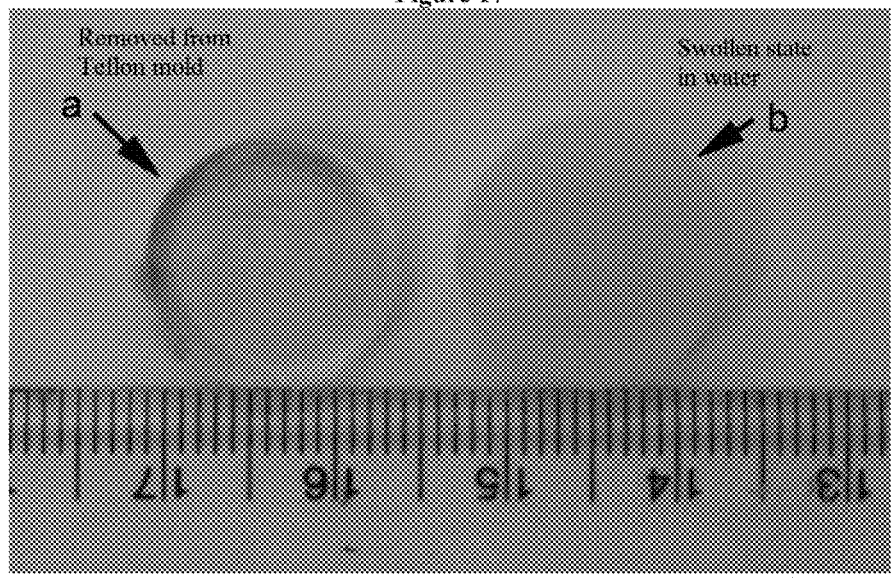

FIG. 17. Hybrid gel made from sulfonic acid-terminated unsaturated functional PEA Macromer 4.2 and PEG-750 diacrylate.

Figure 18:
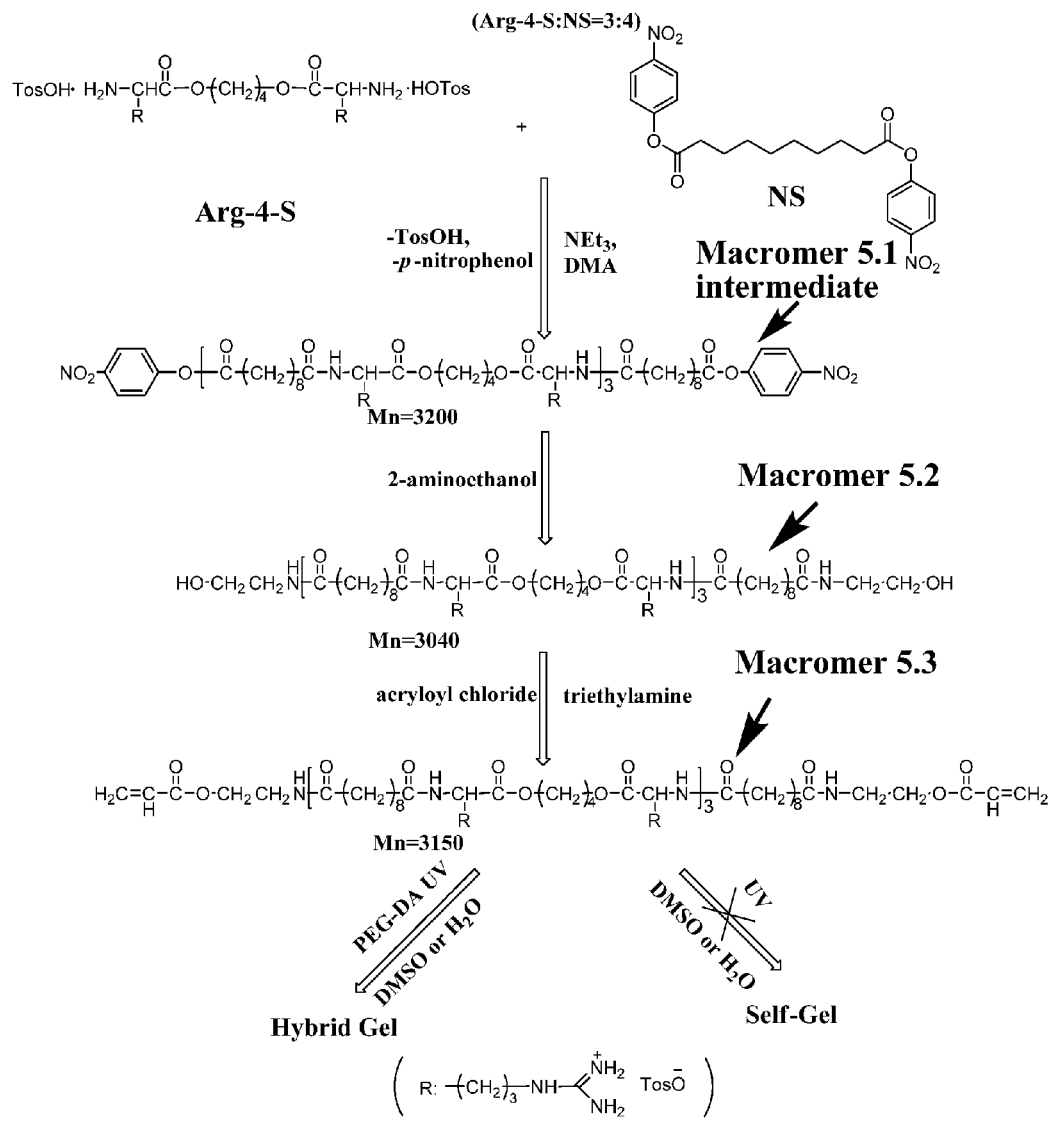

FIG. 18 (Scheme 5). Synthesis of Macromer 5.1, Macromer 5.2 and Macromer 5.3.

Figure 19:
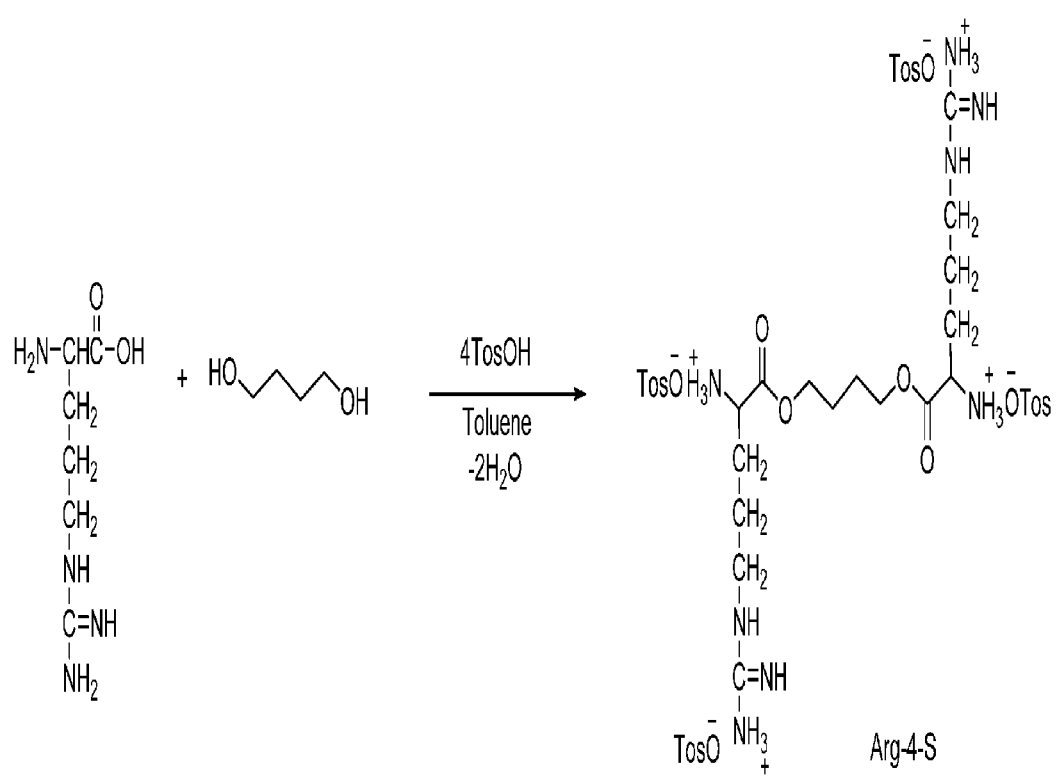

FIG. 19. Synthesis of Di-p-toluenesulfonic Acid Salt of Bis-L-arginine Butane-1,4-diester Monomer (Arg-4-S).

Figure 20:
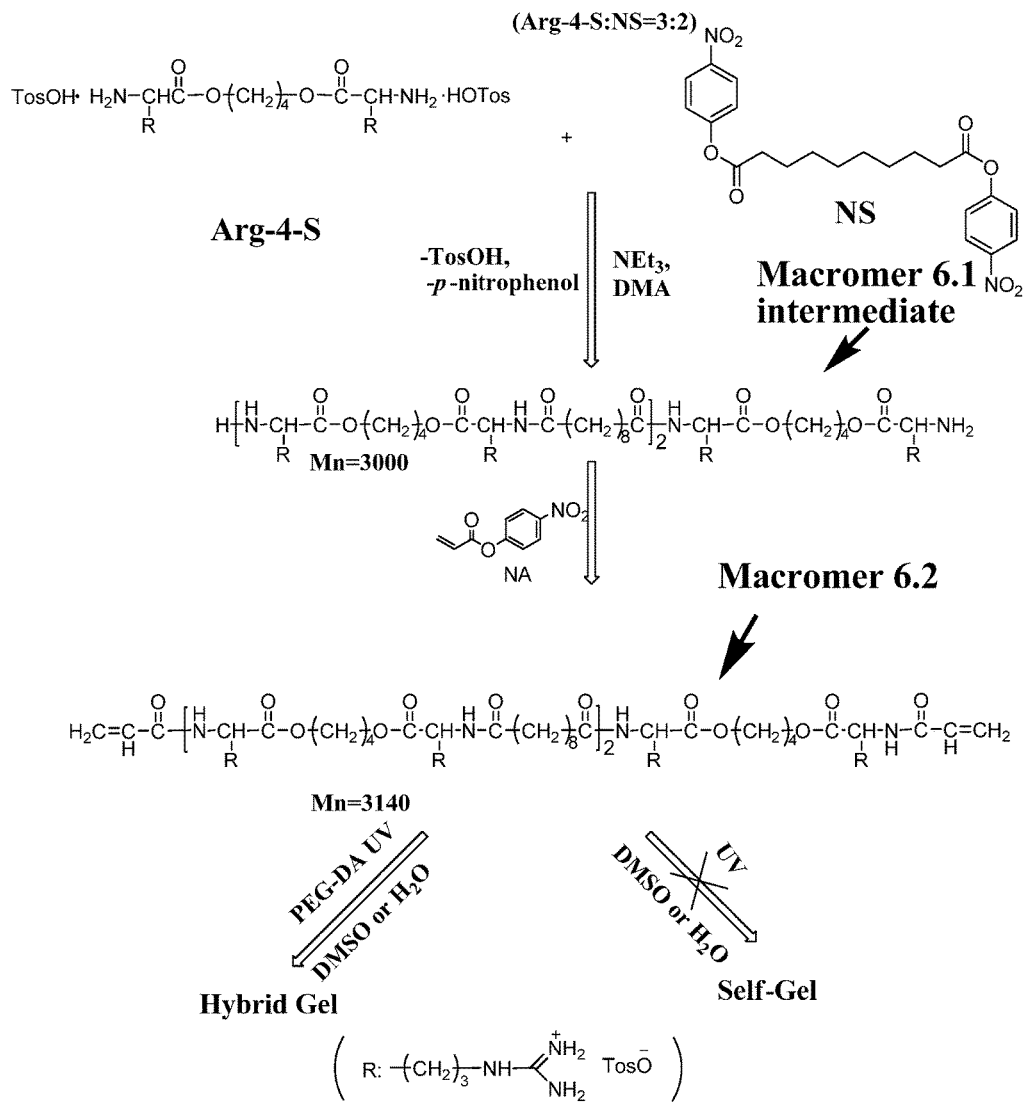

FIG. 20 (Scheme 6). Synthesis of Macromer 6.1 and Macromer 6.2.

Figure 21:
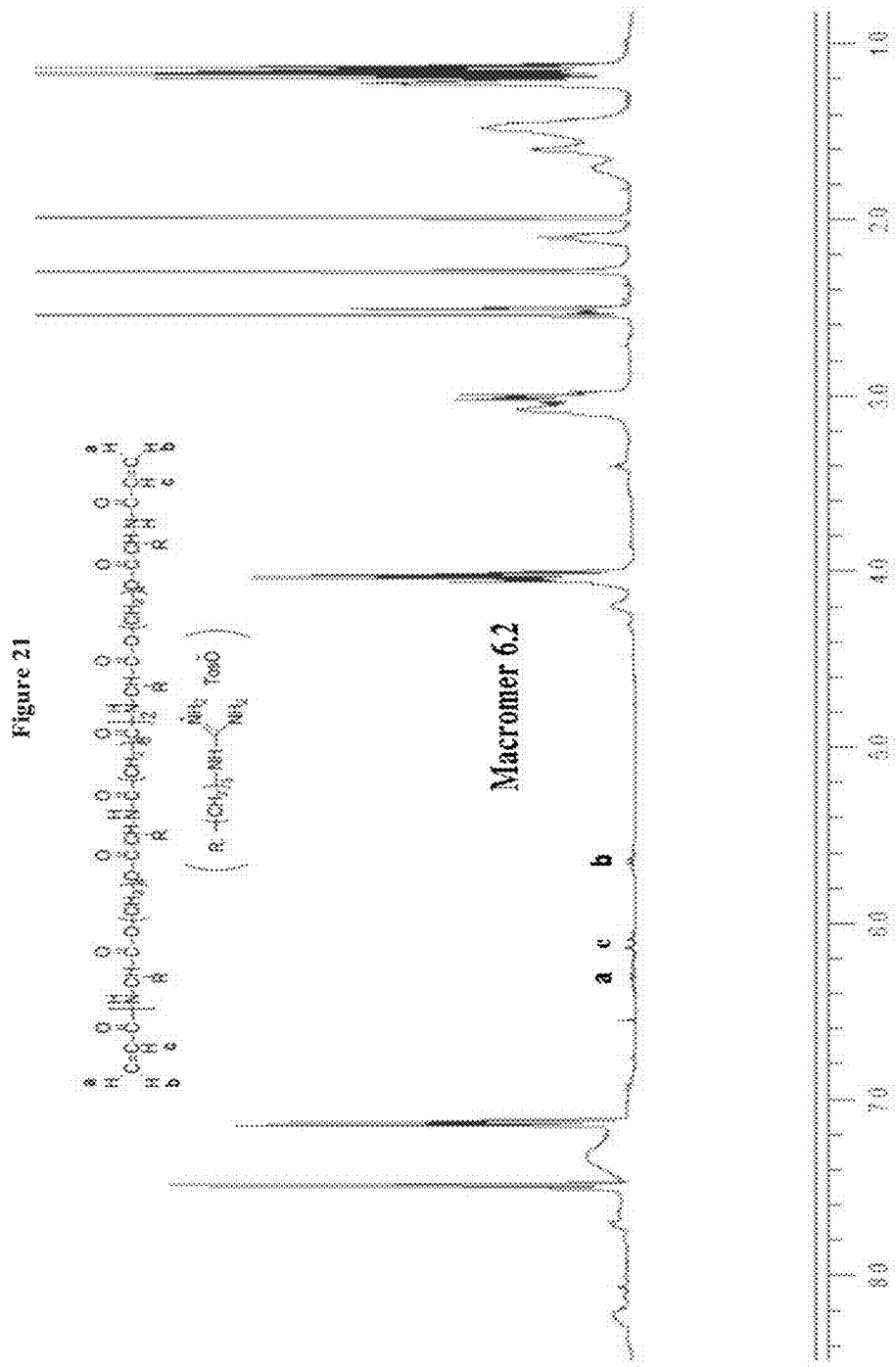

FIG. 21. $^1$H NMR spectrum of Macromer 6.2.

Figure 22:
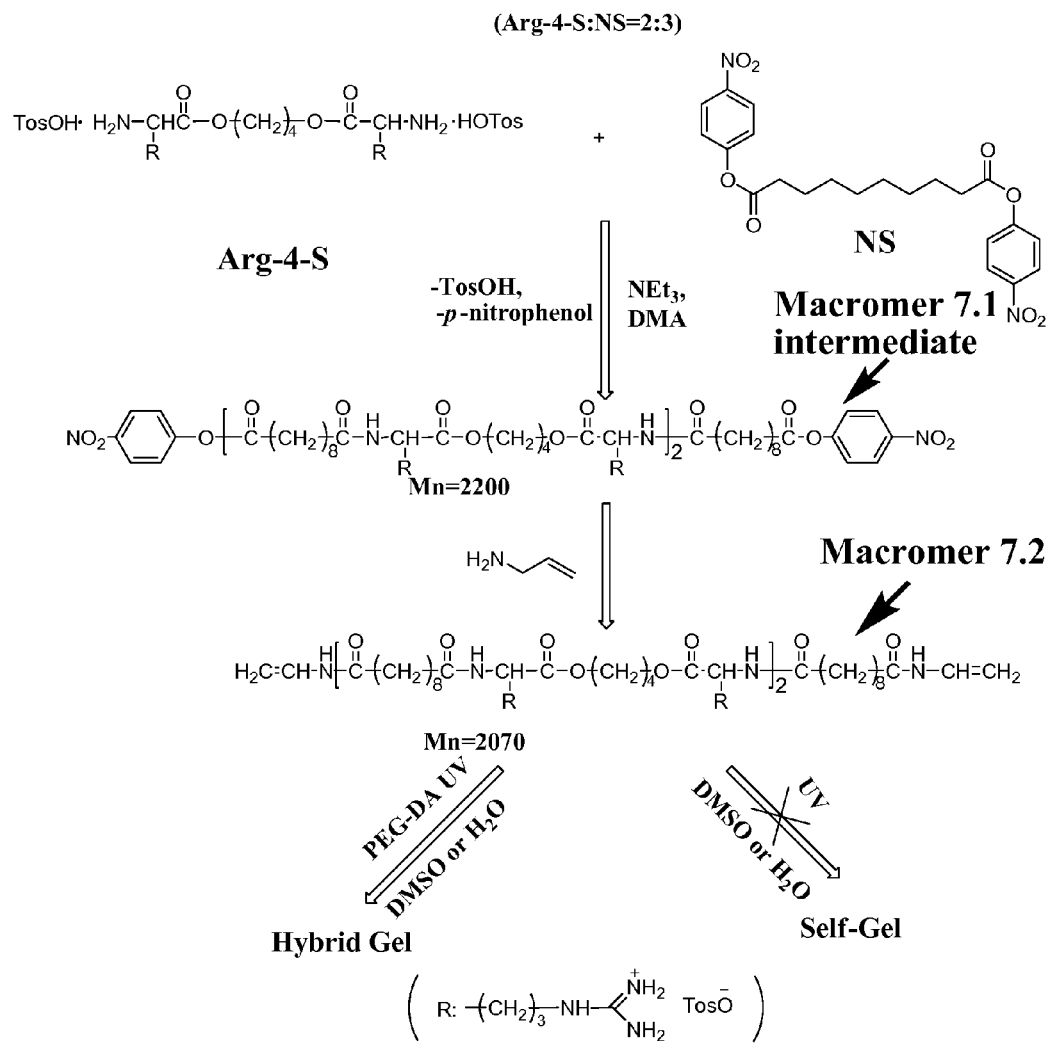

FIG. 22 (Scheme 7). Synthesis of Arg-Based Macromer (III) with functional double bond end groups.

Figure 23:
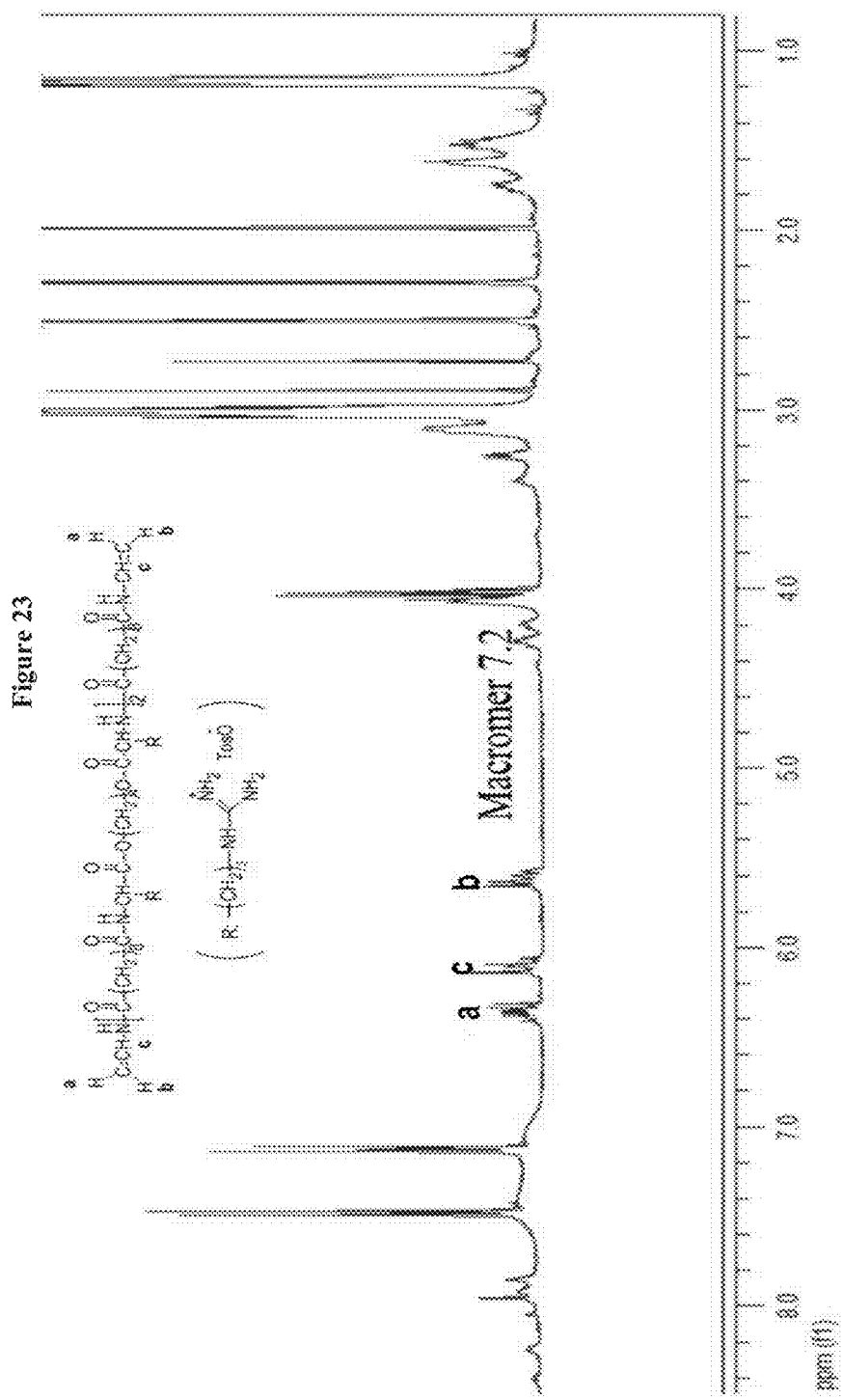

FIG. 23. $^1$H NMR spectrum of Macromer 7.2.

Figure 24:
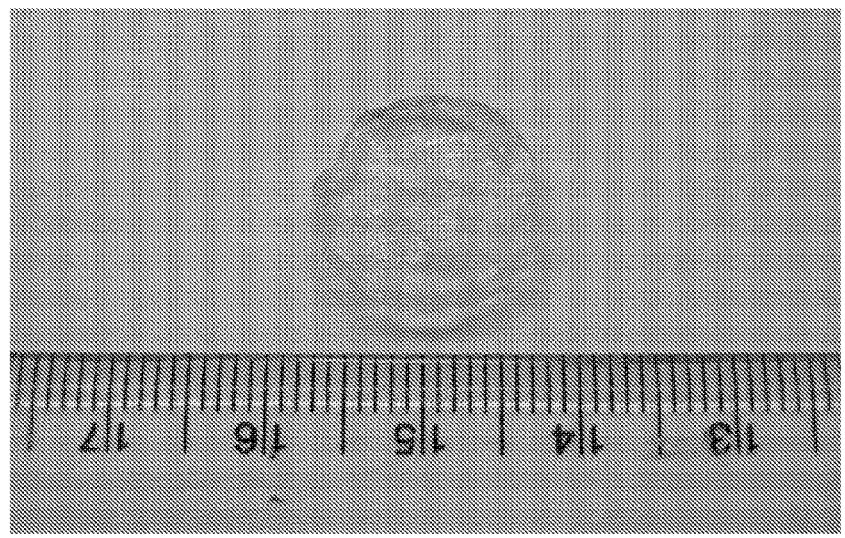

FIG. 24. Hybrid gel made from Macromer 7.2 and PEA-750 diacrylate.

Figure 25:
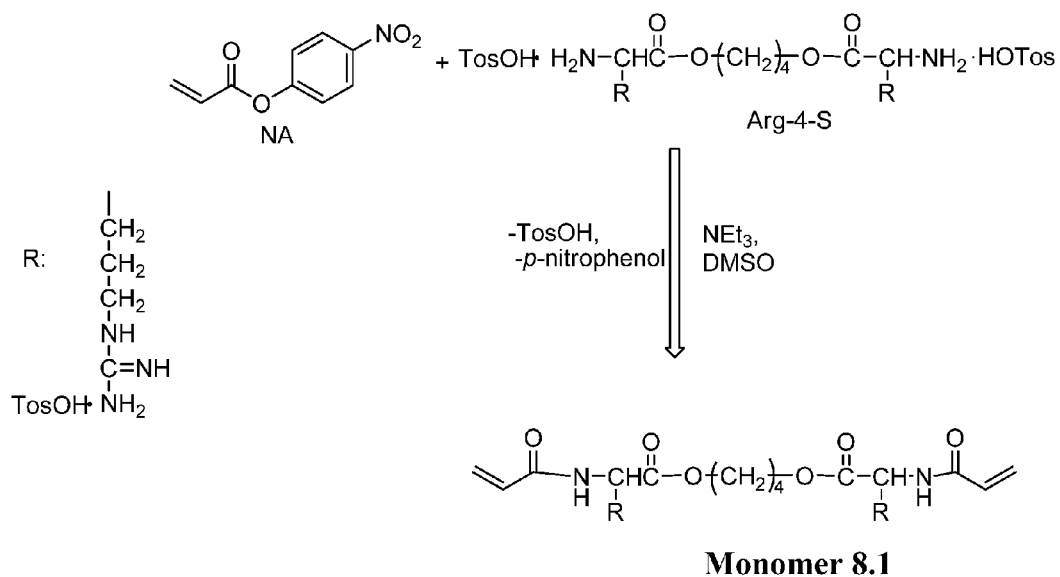

FIG. 25 (Scheme 8). Synthesis of Monomer 8.1.

Figure 26:
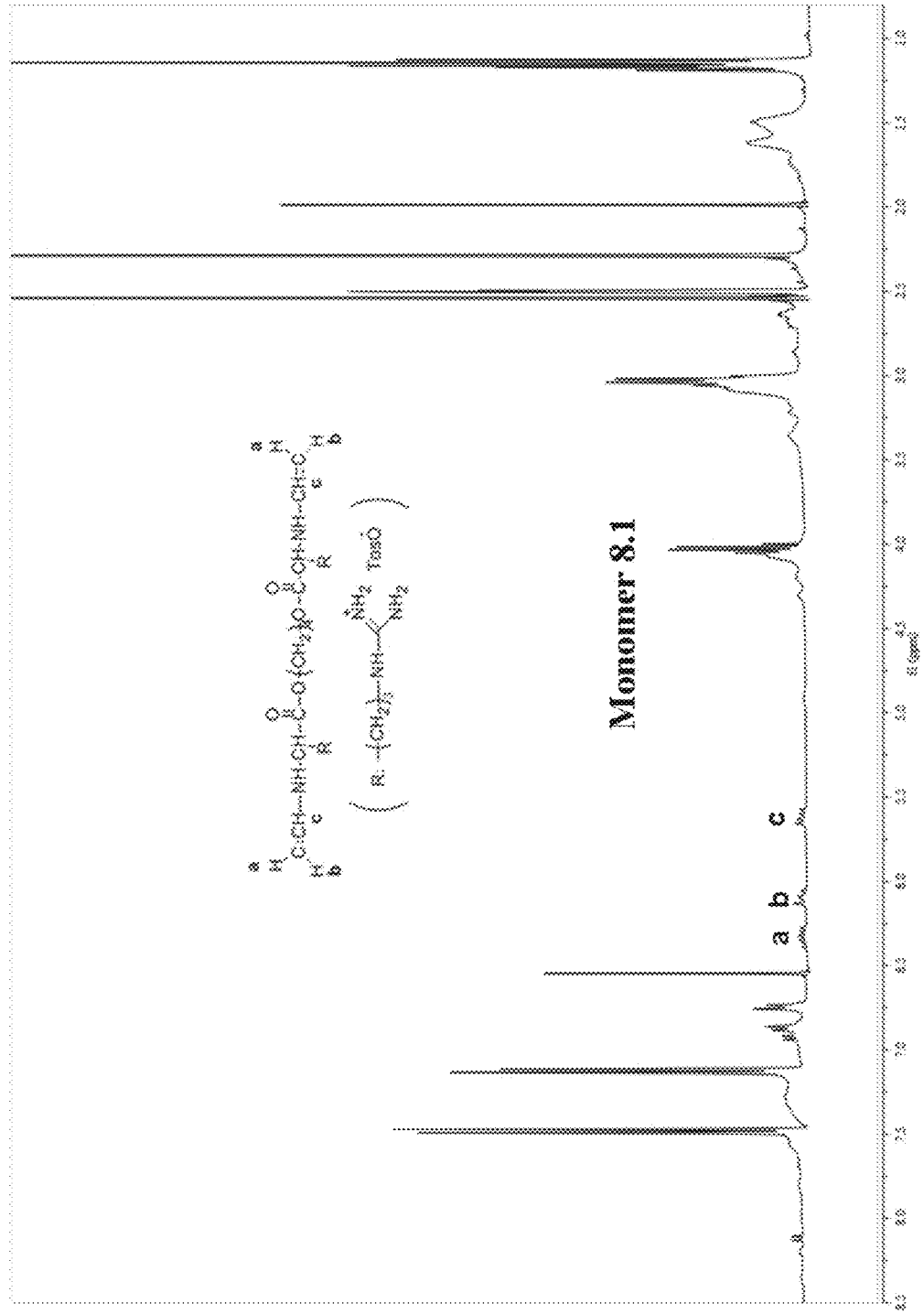

FIG. 26. $^1$H NMR spectrum of Macromer 8.1.

DETAILED DESCRIPTION OF THE INVENTION

The present invention provides new amino acid-based poly(ester amide) (PEA) macromers (also referred to as functional PEA macromers) and polymers thereof. The present invention also provides methods of preparing and uses of such amino acid-based PEA macromers and polymers thereof.

The functional PEA macromers comprise functional groups such as hydroxyl, amine, sulfonic acids, carboxyl, thiol and acryloyl at the two terminals of the PEA macromer. The content of the terminal functional groups of the macromers can be controlled by adjusting the molar ratio of reactive monomers.

The versatility of the functional PEA macromers can be used to fabricate a wide range of PEAs and PEA hybrid derivatives with different chemical, physical, mechanical, thermal and biological properties. The functional PEA macromers can also be polycondensed into forming block PEA polymers.

The alkyl and alkylene groups of the present invention have, for example, from 1 carbon to 20 carbon atoms, including all ranges and integers therebetween. The alkyl and alkylene groups can be substituted or unsubstituted. The alkyl and alkylene groups can also be branched or linear. In an embodiment, the alkyl group is a $C_1$ to $C_{20}$ alkyl group that has from 1 carbon to 20 carbons, including all ranges and integers therebetween.

The alkenyl and alkenylene groups of the present invention have, for example, at least one carbon-carbon double bond. The alkenyl and alkenylene groups can have from 2 carbon atoms to 20 carbon atoms, including all ranges and integers therebetween. The alkenyl and alkenylene groups can be substituted or unsubstituted. The alkenyl alkenylene groups can also be branched or linear. In an embodiment, the alkenyl group is a $C_2$ to $C_{20}$ alkenyl group that has from 2 carbons to 20 carbons, including all ranges and integers therebetween.

As used herein, the term "alkylene diol group" means a group comprising an alkylene moiety and at least two oxygen moieties. An example of such a group is —O—$(CH_2)_n$—O—. The alkylene moiety diol group can have from 1 carbon atoms to 20 carbon atoms, including all ranges and integers therebetween. The alkylene moiety can be substituted or unsubstituted. The alkylene moiety can also be branched or linear. In an embodiment, the alkylene diol group is a $C_1$ to $C_{20}$ alkylene diol group that has from 1 carbons to 20 carbons, including all ranges and integers therebetween.

As used herein, the term "alkylene ether group" means a group comprised of at least one alkyl ether moiety. An example of an alkylene ether moiety is —(O—$(CH_2)_n)_m$—O—, where n and m are independently an integer from 1 to 8, including all ranges and integers therebetween. The alkylene ether group can have from 2 carbons to 20 carbons, including all ranges and integers therebetween. The alkylene ether group comprises from 1 to 10, including all ranges and integers therebetween, alkylene ether moieties. The alkylene moiety of the alkylene ether moiety group can have from 1 carbon atoms to 10 carbon atoms, including all ranges and integers therebetween. The alkylene moiety can be substituted or unsubstituted. The alkylene moiety can also be branched or linear. In an embodiment, the alkylene ether group is a $C_4$ to $C_{20}$ alkylene ether group that has from 4 carbons to 20 carbons, including all ranges and integers therebetween. In an embodiment, the alkylene ether moiety is —(O—$(CH_2)_n)_m$—O—.

As used herein, the term "side-group of a naturally occurring amino acid" means any side-chain from a naturally occurring amino acid (e.g., H— from glycine, $CH_3$— from alanine, $CH_2$-Ph from phenylalanine, and an alkylguanidinium group from arginine, and the like). In various embodiments, the side-group of a naturally occurring amino acid is the side group of one of the 20 naturally occurring amino acids.

As used herein, the term "side group of a non-naturally occurring amino acid" means any side chain from synthetic non-naturally occurring amino acids (also referred to as non-standard amino acids). Examples of side groups of non-naturally occurring amino acids not found in naturally occurring amino acids include, but are not limited to, alkenyl groups (e.g., substituted and unsubstituted, and branched and linear) comprising at least one carbon-carbon double bond and having from 3 carbons to 10 carbons (including all ranges and integers therebetween), alkyl groups (e.g., substituted and unsubstituted, and branched and linear), and aryl groups (e.g., substituted and unsubstituted). An example of a non-naturally occurring amino acid is allyl glycine.

As used herein the term "end group" means a group which terminates a PEA macromer or polymer. In various embodiments, it is desirable that the end group have at least one functional group (e.g., —F, —Cl, —C=C—, —OH, —$NH_2$, —C(O)OH, —C(O)$NH_2$, —SH, and the like), which can be covalently bonded to the PEA macromer or polymer via a group. Examples of such groups include, but are not limited to, hydrogen, 1,4-nitrophenoxy group, —NH-alkenyl ($C_2$-$C_{10}$) group, —NH-alkynyl ($C_2$-$C_{10}$) group, —NH-alkyl ($C_2$-$C_{10}$) thio group, —NH-alkyl ($C_2$-$C_{10}$) hydroxyl group, —NH-alkyl ($C_2$-$C_{10}$) amino group, NH-alkyl ($C_2$-$C_{10}$) carboxyl group and NH-alkyl ($C_2$-$C_{10}$) halo substituted group.

As used herein, the term "linking group" (e.g., $L^1$ and $L^2$) is any group which covalently bonds (i.e., joins) adjacent macromer units in a polymer. Such a group is formed from a polymerization reaction between two macromers functionalized with groups which can react to form the linking group. Examples of linking groups include, but are not limited to, —C(O)NH— and —C(O)O—. In an embodiment, monomers are functionalized with groups such that on polymerization of two monomers a linking group is formed.

In an aspect, the present invention provides functional PEA macromers. The macromers of the present invention can be made, for example, by reaction of two monomers as shown in FIGS. 1, 6, 14, 18, 20 and 25.

In an embodiment, a PEA macromer has the following structure:

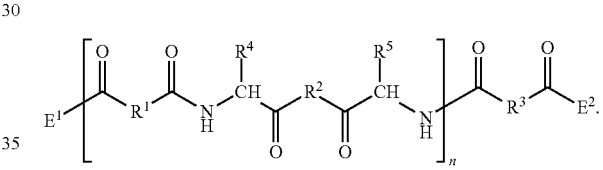

In this embodiment, $R^1$ at each occurrence in the macromer is independently selected from a $C_1$ to $C_{20}$ alkylene group, $C_2$ to $C_{20}$ alkenylene group, $C_1$ to $C_{20}$ alkylene diol group, and $C_4$ to $C_{20}$ alkylene ether group, $R^2$, at each occurrence in the macromer is independently selected from a $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_2$ to $C_{20}$ alkylene diol group and $C_4$ to $C_{20}$ alkylene ether group, $R^4$ and $R^5$ at each occurrence in the macromer are independently a side-group of a naturally occurring amino acid or non-naturally occurring amino acid, $E^1$ and $E^2$ are each independently an end group, and n is an integer from 1 to 20, including all ranges and integers therebetween. In an embodiment, $R^1=R^3$ and/or $R^4=R^5$.

Examples of macromers of this embodiment include, but are not limited to, macromers with the following structures:

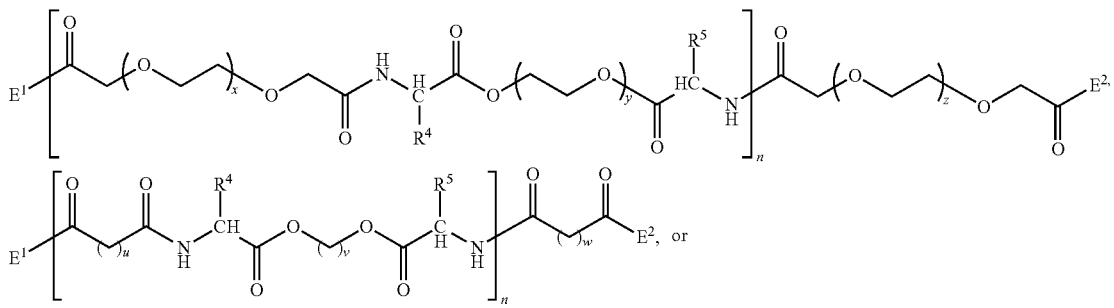

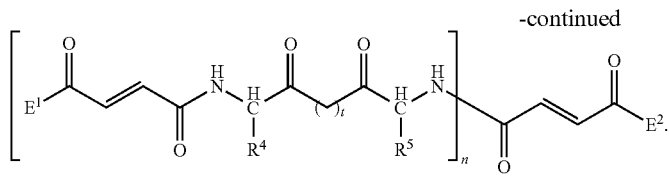

In these examples, x is an integer from 1 to 10, including all ranges and integers therebetween, y is an integer from 1 to 10, including all ranges and integers therebetween, z is an integer from 1 to 10, including all ranges and integers therebetween, u is an integer from 1 to 20, including all ranges and integers therebetween, v is an integer from 1 to 20, including all ranges and integers therebetween, w is an integer from 1 to 20, including all ranges and integers therebetween, and t is an integer from 1 to 20, including all ranges and integers therebetween.

In another embodiment, a macromer has the following structure:

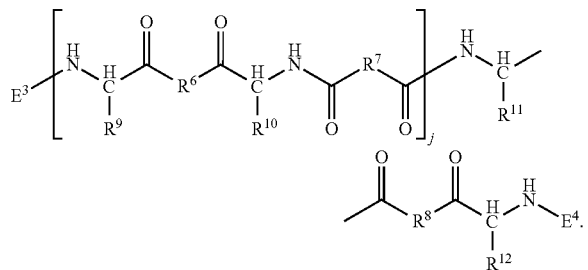

In this embodiment, $R^6$ at each occurrence in the macromer is independently selected from a $C_1$ to $C_{20}$ alkyl diol group and $C_4$ to $C_{20}$ alkyl ether group, $R^7$ at each occurrence in the macromer is independently selected from a $C_1$ to $C_{20}$ alkylene group, $C_2$ to $C_{20}$ alkenylene group, $C_1$ to $C_{20}$ alkylene diol group, and $C_4$ to $C_{20}$ alkylene ether group, $R^8$ is selected from a $C_1$ to $C_{20}$ alkylene diol group and $C_4$ to $C_{20}$ alkylene ether group, $R^9$ and $R^{10}$ at each occurrence in the macromer are independently a side-group of a naturally occurring amino acid or a non-naturally occurring amino acid, $R^{11}$ and $R^{12}$ are each independently a side-group of a naturally occurring amino acid or a non-naturally occurring amino acid, $E^3$ and $E^4$ are each independently an end group, and j is an integer from 1 to 20, including all ranges and integers therebetween. In an embodiment, $R^6=R^8$ and/or $R^9=R^{10}=R^{11}=R^{12}$.

Examples of macromers of this embodiment include, but are not limited to, macromers with the following structures:

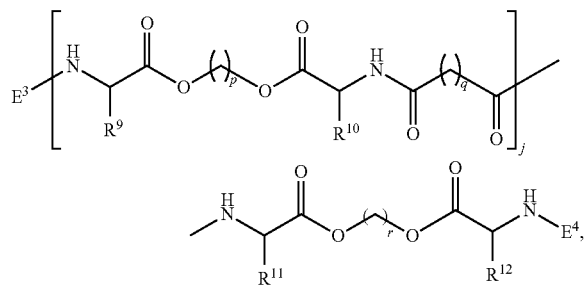

wherein p is an integer from 1 to 20, including all ranges and integers therebetween, q is an integer from 1 to 20, including all ranges and integers therebetween, and r is an integer from 1 to 20, including all ranges and integers therebetween.

The PEA macromers of the present invention can have a range of number averaged molecular weights, $M_n$, and a weight averaged molecular weights, $M_w$. For example, the macromers can have a $M_n$ of from 0.4 kg/mol to 100 kg/mol, including all integers and ranges to the 0.1 kg/mol therebetween. For example, the macromers can have a $M_w$ of from 0.4 kg/mol to 100 kg/mol, including all integers and ranges to the 0.1 kg/mol therebetween. The $M_n$ and/or $M_w$ of the macromers can be determined by, for example, gel permeation chromatography.

In an embodiment, the PEA macromers (or polymers of PEA macromers) have one or more counter-ions (e.g., having a pKa from about −7 to +5) associated with positively charged groups (e.g., the alkyl guanidinium group of arginine) therein. Examples of counter-ions suitable to associate with the macromers or polymers of the invention composition are counter-anions of weak acids. Examples of such counter-anions include $CH_3COO^-$, $CF_3COO^-$, $CCl_3COO^-$, Tos⁻ (Tos=p-toluene sulfonic acid, ester) and the like. Other examples of suitable counter ions include halides, such as $F^-$, $Cl^-$ and $Br^-$, sulfate and nitrate. In one embodiment, macromers or polymers have one or more ammonium groups that are present as a halide, Tos⁻, acetate, halogen-substituted acetate, sulfate, nitrate, or a combination thereof, salt.

In an embodiment, the functional PEA macromer has photo-crosslinkable —C=C— bonds at least one of the two end groups of the PEA macromer. This monomer can be used, for example, as a cross-linker for photo-crosslinking or/and for making copolymers having PEA segments using photo-crosslinking.

In an aspect, the present invention provides PEA polymers comprising PEA macromer and methods of making such polymers. The polymers of the present invention can be made by polymerization of macromers of the present invention. The PEA polymers can be homopolymers or copolymers.

Figure 13:
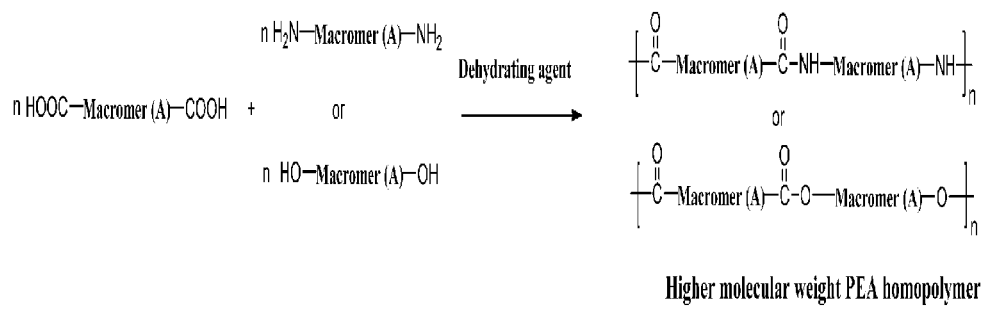
FIG. 13 (Scheme 3.2). Preparation of higher molecular weight PEA homopolymers and copolymers.
Figure 13:
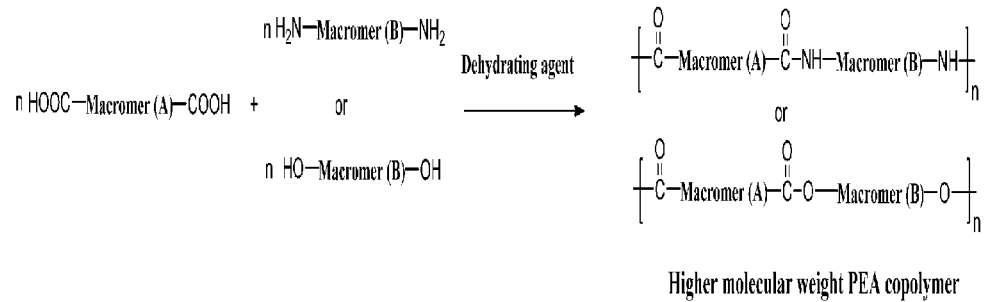

FIG. 13 (Scheme 3.2) shows preparation of higher molecular weight PEA homopolymers and copolymers. For example, as shown in FIG. 13 (Scheme 3.2), HOOC-Macromer-COOH and $H_2N$-Macromer-$NH_2$ (or HO-Macromer-OH) can polycondense together under dehydrating agent to form a higher molecular weight PEA homopolymer or a copolymer (e.g., if the two functional macromers have different PEA backbones, prepared from different amino acids). Also as shown in FIG. 13 (Scheme 3.2), HOOC-Macromer-COOH functional macromer can act as a macromer cross-linker to cross-link functional PEA with a pendant —$NH_2$ group in the presence of dehydrating agent. (see, e.g., Deng et al., Biomacromolecules 10 (11), 3037-3047). $H_2N$-Macromer-$NH_2$ functional macromer can also act as a macromer cross-linker to cross-link functional PEAs having pendant —COOH group (such as those disclosed in U.S. Pat. No. 6,503,538) in the presence of dehydrating agent.

In an embodiment, a PEA polymer has the following structure:

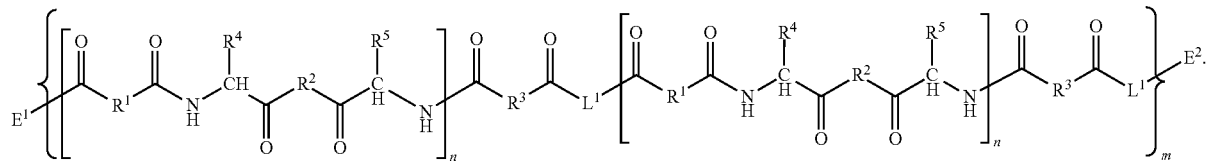

In this embodiment, $R^1$ at each occurrence in the polymer is independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^2$ at each occurrence in the polymer is independently selected from a $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^4$ and $R^5$ at each occurrence in the polymer are independently a side-group of a naturally occurring amino acid or a non-naturally occurring amino acid, $L^1$ and $L^2$ at each occurrence in the polymer are independently a linking group, $E^1$ and $E^2$ are each independently an end group, and n at each occurrence in the polymer is an integer from 1 to 20, including all ranges and integers therebetween, and m is an integer from 2 to 100, including all ranges and integers therebetween. In an embodiment, $R^1=R^3$ and/or $R^4=R^5$.

In an embodiment, a PEA polymer of has the following structure:

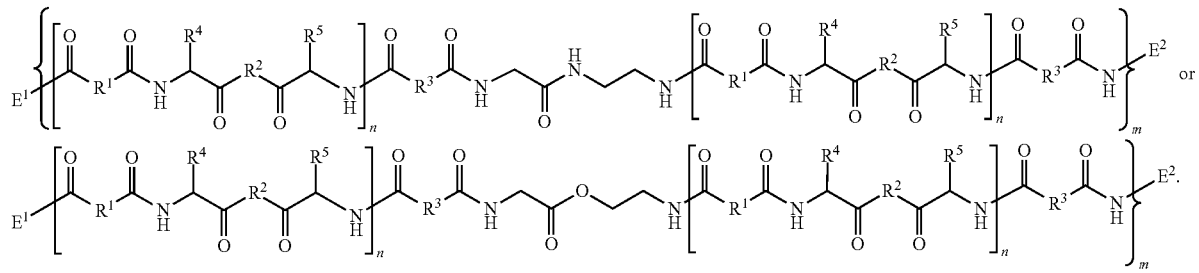

PEA polymers of the above embodiments can be made by polymerization of the appropriate macromers of the present invention. In an embodiment, a method for making such polymers comprises the steps of: a) mixing a first macromer having the following structure:

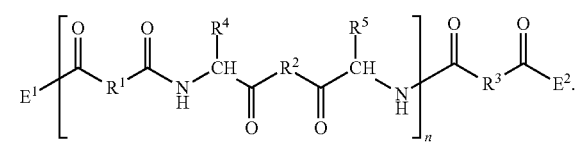

where $R^1$ at each occurrence in the macromer is independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^2$ at each occurrence in the macromer is independently selected from $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^4$ and $R^5$ at each occurrence in the macromer are independently a side-group of a naturally occurring amino acid or a non-naturally occurring amino acid, $E^1$ and $E^2$ are each —NHCH$_2$COOH or an —NH-alkyl ($C_2$-$C_{10}$) COOH, and n is an integer from 1 to 20, including all ranges and integers therebetween, and a second macromer having the following structure:

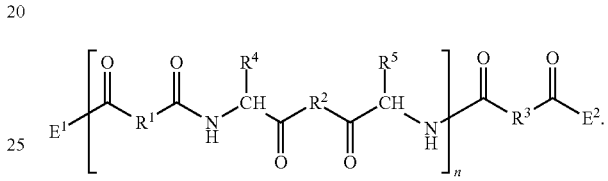

where $R^1$ at each occurrence in the macromer is independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^2$ at each occurrence in the macromer is independently selected from a $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^4$ and $R^5$ at each occurrence in the macromer are independently a side-group of a naturally occurring amino acid or non-naturally occurring amino acid, $E^1$ and $E^2$ are each one of the following end groups: an —NH-alkyl ($C_2$-$C_{10}$) amino group or an —NH-alkyl ($C_2$-$C_{10}$) hydroxyl group, and n is an integer from 1 to 20, including all ranges and integers therebetween, in a ratio of first macromer:second macromer of 0.5:1 to 2:1, including all ranges and values to 0.1 therebetween, and optionally, a solvent; and b) mixing the mixture from a) with a dehydrating agent until polymerization has proceeded to the desired extent.

The solvent can be any solvent in which the macromers and dehydrating agent can react. It is desirable that the macromers and dehydrating agent have sufficient solubility in the solvent such that a polymerization reaction can occur. Examples of suitable solvents include, but are not limited to, dimethylsulfoxide (DMSO), dimethylformamide (DMF), N,N-dimethylacetamide (DMA) and the like.

The dehydrating agent is any reagent which facilitates a reaction between macromers to form a linking group. Examples of such reagents includes, but is not limited to, N,N'-dicyclohexylcarbodiimide (DCC), N,N'-diisopropyl-carbodiimide (DIC), 1-ethyl-3-(3-dimethylaminopropyl) carbodiimide (EDC), N,N'-carbonyldiimidazole (CDI) and the like.

The reaction time is the time required for a polymerization reaction to proceed to the desired extent. In various embodiments, the reaction time is the time required for the polymerization reaction to proceed such that at least 50%, 60%, 70%, 80%, 90%, 95% or 99% of monomers to polymerize.

The PEA polymers of the present invention can have a range of number averaged molecular weights, $M_n$, and a weight averaged molecular weights, $M_w$. For example, the polymers can have a $M_n$ of from 0.4 kg/mol to 100 kg/mol, including all integers and ranges to the 0.1 kg/mol therebetween. For example, the polymers can have a $M_w$ of from 0.4 kg/mol to 100 kg/mol, including all integers and ranges to the 0.1 kg/mol therebetween. The $M_n$ and/or $M_w$ of the polymers can be determined by, for example, gel permeation chromatography.

In an aspect, the present invention provides compositions comprising the PEA macromers and PEA polymers of the present invention. In an embodiment, a composition is provided comprising a low MW nitrophenol end-capped PEA macromer wherein the backbone portion of the nitrophenol end-capped PEA macromer comprises a complete PEA. A method for synthesizing a low MW nitrophenol end-capped PEA macromer (e.g., see FIGS. 1, 2, 14, 18, 20, 22 and 25) is also provided.

A composition comprising a functional PEA macromer is also provided, wherein the functional PEA macromer comprises a terminal functional group at each of the two ends of the macromer, wherein the terminal functional group is nucleophilic or electrophilic. In an embodiment, the terminal functional group is selected from the group consisting of hydroxyl, amine, sulfonic acid, carboxyl, thiol, acryloyl and vinyl groups. In another embodiment, the terminal functional group is hydroxyl and the macromer has a chemical formula described by the general structural formula of Macromer 2.2, Macromer 5.2 or HO-Macromer-OH in Scheme 3. In another embodiment, the terminal functional group is amine and the macromer has a chemical formula described by the general structural formula of $H_2N$-Macromer-$NH_2$ in Scheme 3 or Macromer 6.1 in Scheme 6. In another embodiment, the terminal functional group is sulfonic acid and the macromer has a chemical formula described by the general structural formula of Macromer 4.2 in Scheme 4. In another embodiment, the terminal functional group is carboxyl and the macromer has a chemical formula described by the general structural formula of HOOC-Macromer-COOH in Scheme 3. In another embodiment, the terminal functional group is thiol and the macromer has a chemical formula described by the general structural formula of HS-Macromer-SH in Scheme 3. In another embodiment, the terminal functional group is acryloyl or vinyl and the macromer has a chemical formula described by the general structural formula of Macromers 1.2, 2.3, 5.3, 6.2 or 7.2.

A composition comprising a functional Arg-based monomer is also provided, wherein the Arg-based monomer comprises an active double bond at each of the two ends of the monomer. A method for synthesizing a functional PEA macromer is also provided, wherein the method comprises providing a nitrophenol end-capped PEA macromer, wherein: the functional PEA macromer comprises a terminal functional group at each of the two ends of the macromer, and the terminal functional group is selected from the group consisting of hydroxyl, amine, sulfonic acid, carboxyl, thiol, acryloyl and vinyl groups. A composition comprising a Phe-EG based functional macromer is also provided. A method for synthesizing a Phe-EG based functional macromer comprising the steps set forth in Scheme 1 is also provided. A composition comprising a Phe-based functional macromer is also provided. A method for synthesizing a Phe-based functional macromer comprising the steps set forth in Scheme 2 is also provided.

In an aspect the present invention provides a method of making functional PEA macromers. For example, the nitrophenoxy end-capped PEA macromer intermediates (Macromer 1.1 or 2.1) shown in FIG. 12 (Scheme 3.1) and FIG. 13 (Scheme 3.2) can serve as activated precursors for the preparation of additional functionalized PEA-based macromers having a wide range of functional end-groups.

Figure 12:
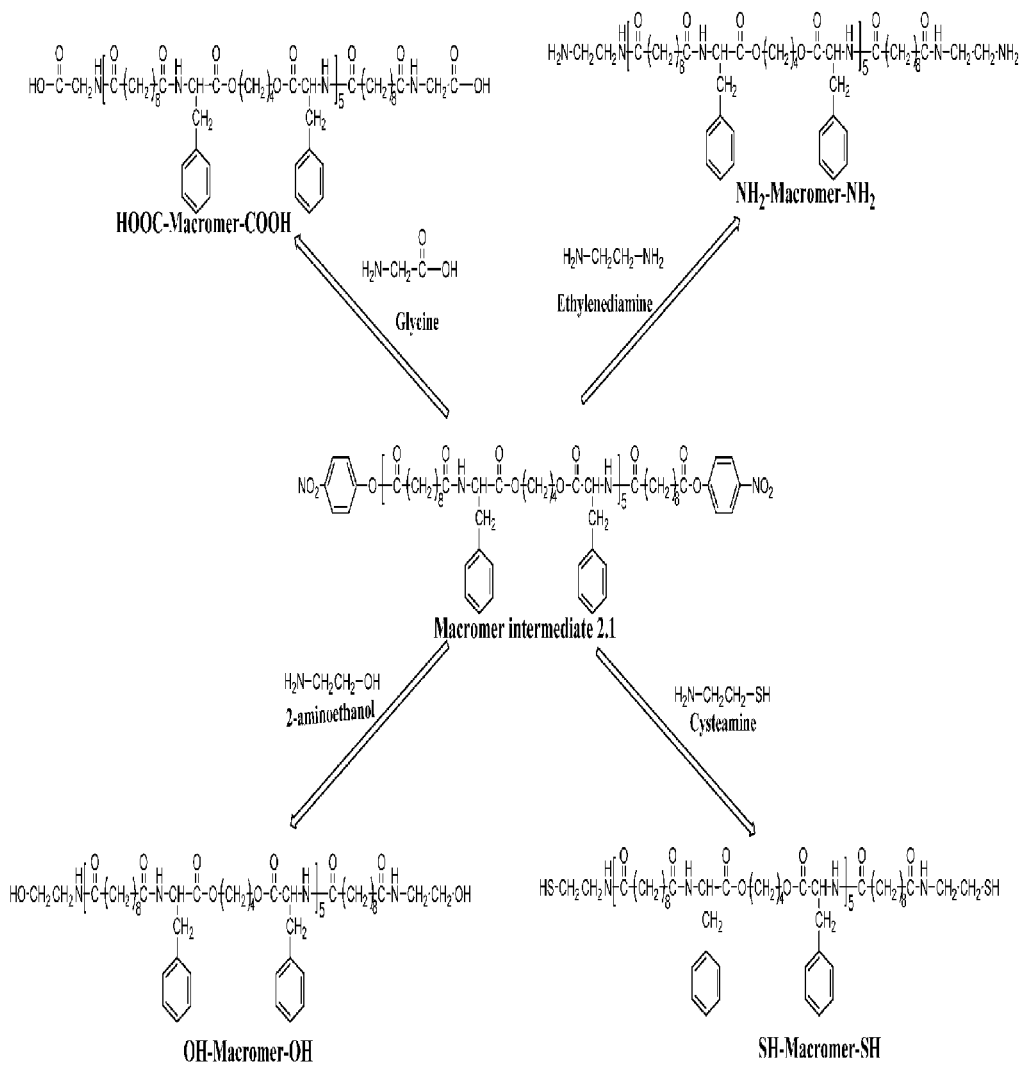
FIG. 12 (Scheme 3.1). Synthesis of additional functional macromers having a wide range of functional end-groups from Macromer 2.1 (or 1.1).

FIG. 12 (Scheme 3.1) illustrates the synthesis of exemplary PEA-based macromer derivatives based on Macromer 2.1. By reacting Macromer 2.1 with glycine, ethylenediamine, 2-aminothanol and cysteamine, additional functionalized PEA-based macromers having carboxyl, amine, hydroxyl and thiol end-groups, respectively, can be obtained, as shown in Scheme 3.1. HO-Macromer-OH and HS-Macromer-SH are two examples of such functional PEA macromers that can be obtained.

A method for synthesizing a functional macromer comprising the steps set forth in Scheme 3.1 is also provided. A method for synthesizing a PEA homopolymer or copolymer comprising the steps set forth in Scheme 3.2 is also provided. A composition comprising a sulfonic acid-terminated unsaturated functional PEA macromer is also provided. A method for synthesizing a sulfonic acid-terminated unsaturated functional PEA macromer comprising the steps set forth in Scheme 4 is also provided. A composition comprising an Arg-Based Macromer 5.3 is also provided. A method for synthesizing an Arg-Based Macromer 5.3 is also provided, wherein the macromer comprises a functional double bond end group, and wherein the method comprises the steps set forth in Scheme 5. A composition comprising an Arg-based Macromer 6.2 is also provided. A method for synthesizing an Arg-based Macromer 6.2, is also provided, wherein the macromer comprises a functional double bond end group, and wherein the method comprises the steps set forth in Scheme 6. A composition comprising an Arg-based Macromer 7.2 is also provided.

A method for synthesizing an Arg-based Macromer 7.2 is also provided, wherein the macromer comprises a functional double bond end group, and wherein the method comprises the steps set forth in Scheme 7. A method for synthesizing a functional Arg-based monomer is also provided, wherein the Arg-based monomer comprises active double bonds at the two ends of the monomer, and wherein the method comprises the steps set forth in Scheme 8.

In an aspect the present invention provides uses of PEA macromers. Functional PEA macromer 2.2 can be used, for example, as a macroinitiator to prepare block copolymers with polylactide and poly(ε-caprolactone). Functional PEA macromer 2.3 (with acryloyl end-groups) can gel by itself using standard photo (e.g., UV) crosslinking. It can also be made into a hybrid hydrogel by crosslinking with PEG diacrylate, polysaccharide acrylate (e.g., as disclosed in PCT/US2009/002017) or unsaturated PEAs (U.S. application Ser. No. 11/587,530). These hydrogels can be used for tissue engineering scaffolds or as carriers for biomolecules. The unsaturated PEA macromer with sulfonic acid end-groups can gel with PEG diacrylate. Such anionic hydrogel products can be used as biologic carriers, e.g., positive charged growth factors. They can also be used as the components of a synthetic extracellular matrix. Functional PEA Macromer 5.3 can form cationic hybrid hydrogels. In one embodiment, the cationic properties of the functional PEA Macromer 5.3 permit it to deliver biologics or biomolecules.

Functional PEA macromers with thiol end-groups (HS-Macromer-SH) can be used to covalently link gold nano particles. Functional PEA macromers with amine end-groups ($H_2N$-Macromer-$NH_2$) can be used as macroinitiators to prepare block copolymers with aliphatic polyesters such as polylactide and poly(ε-caprolactone) via ring-opening polymerization.

A method for controlling release of a molecule or compound is also provided, wherein the method comprises: providing a hydrogel, wherein: the molecule or compound is loaded in the hydrogel, and the hydrogel is synthesized from a functional PEA macromer. A method for directing release of a molecule or compound in an area of interest is provided comprising: providing a hydrogel, wherein: the molecule or compound is loaded in the hydrogel, the hydrogel is synthesized from a functional PEA macromer, and the hydrogel is inserted in the area of interest. In one embodiment, the molecule or compound is a bioactive molecule or compound. In another embodiment, the molecule or compound is a nutrient, pharmaceutical, drug, peptide, polypeptide, oligonucleotide or polynucleotide.

An apparatus for controlling release of a molecule or compound comprising a hydrogel is also provided, wherein: the molecule or compound is loaded in the hydrogel, and the hydrogel is synthesized from a functional PEA macromer. An apparatus for directing release of a molecule or compound in an area of interest comprising a hydrogel is also provided, wherein: the molecule or compound is loaded in the hydrogel, the hydrogel is synthesized from a functional PEA macromer, and the hydrogel is inserted in the area of interest.

The following examples are presented to illustrate the present invention. They are not intended to limiting in any manner.

Example 1

Example of Preparation of Phe-EG Based Functional Macromer

Figure 1:
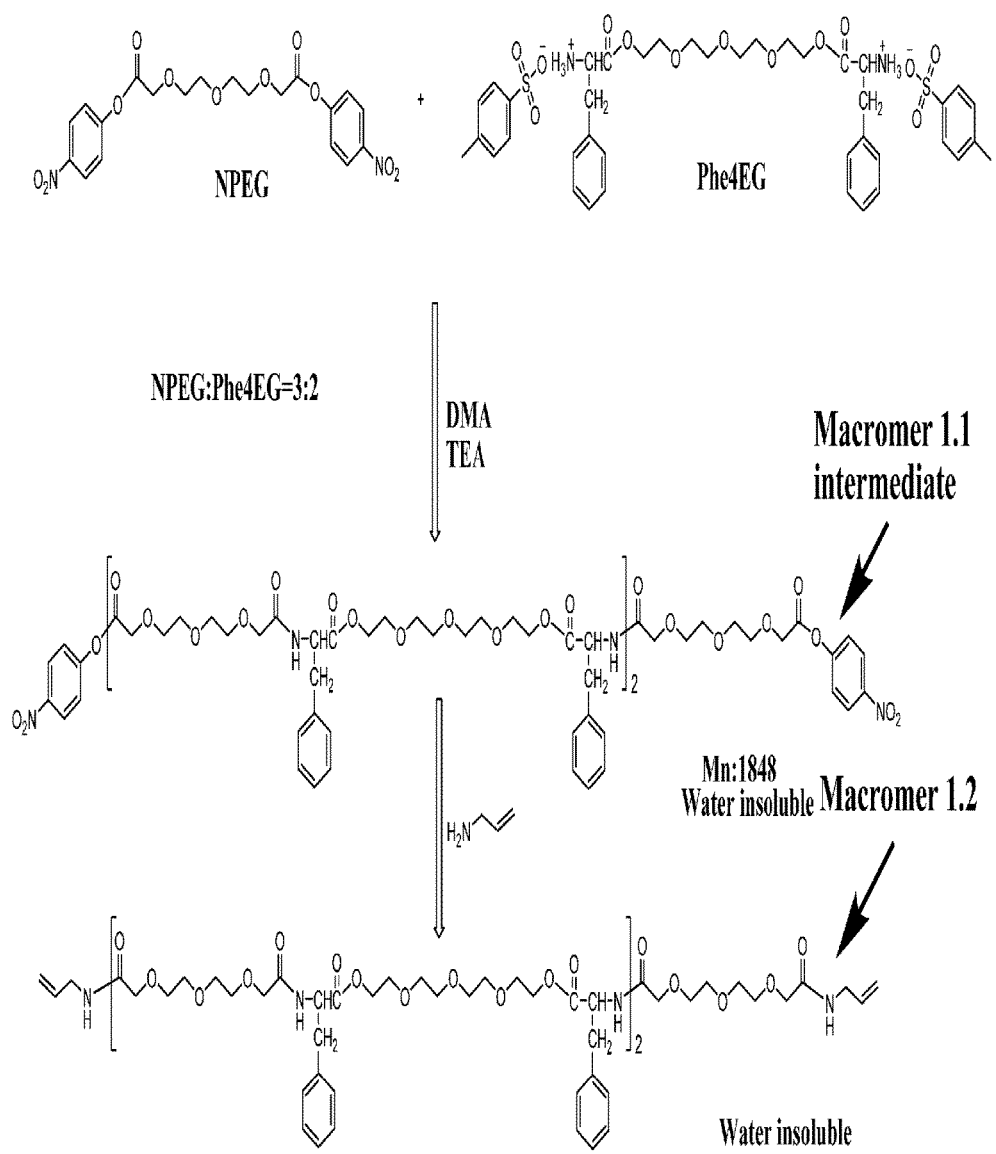
FIG. 1 (Scheme 1). Synthesis of Macromer 1.1 intermediate and Macromer 1.2 from NPEG and Phe4EG.

A Phe-EG based functional macromer is provided. A method for synthesizing a Phe-EG based functional macromer is also provided. FIG. 1 (Scheme 1) shows an embodiment of the method for synthesizing a Phe-EG based functional macromer in which Macromer 1.1 intermediate and Macromer 1.2 are synthesized from NPEG and Phe4EG. NPEG is one of the monomers used to polymerize PEA macromers and polymers. NPEG monomer is formed by the reaction of dicarboxylic acyl chlorides and p-nitrophenol.

Macromer 1.1, an intermediate product, was prepared by using the same synthesis route as for making poly(ester amide) (PEA). In comparison with PEA polymers, PEA macromers have the same chemical structure but lower molecular weight. Macromer 1.1 differs from NPEG monomer in that Macromer 1.1 has PEA structure but NPEG does not.

Figure 2:
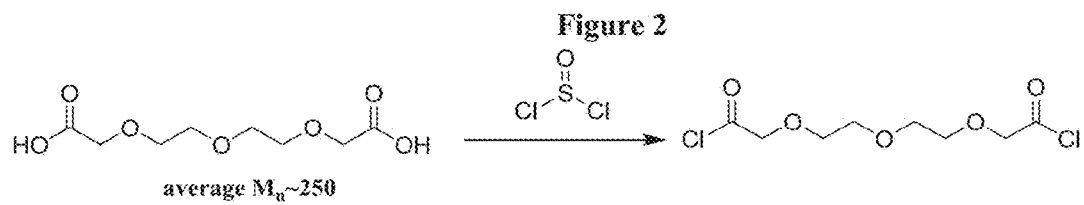
FIG. 2. Synthesis of Polyglycol 250 Acid Dichloride.

Steps of the Scheme 1 synthesis method are as follows. Synthesis of Polyglycol 250 Acid Dichloride (FIG. 2). Polyglycol 250 (20 g, 0.08 mol) and an excess of thionyl chloride (18.91 g, 0.16 mol) were added into a reaction flask. The reaction was then stirred under a nitrogen atmosphere at 60° C. for 16 hrs. Unreacted thionyl chloride was removed by vacuum distillation to obtain solid polyglycol 250 acid dichloride. To purify the crude product, polyglycol 250 acid dichloride was dissolved in chloroform and then precipitated into ethyl ether. The final products was isolated by centrifugation and dried in vacuo. Yield was 87%.

Figure 3:
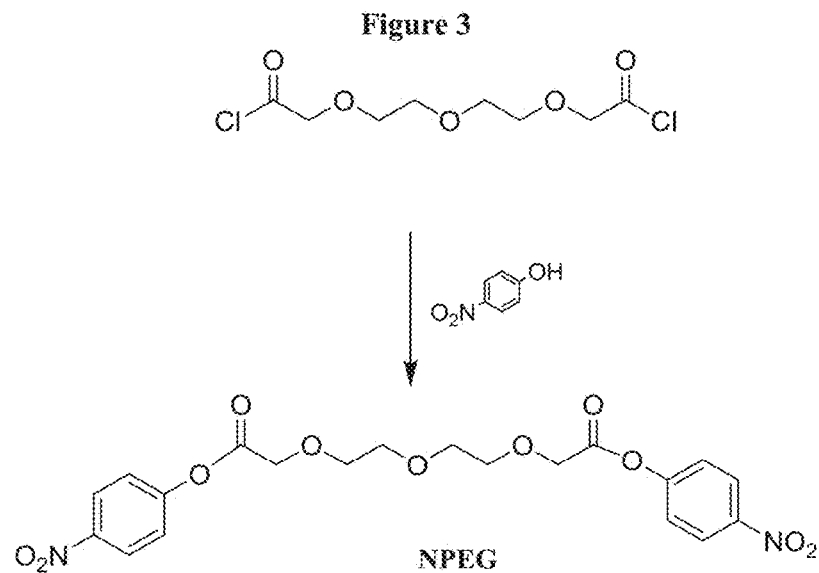
FIG. 3. Synthesis of Di-p-nitrophenyl ester of Polyglycol 250 Diacid (NPEG) monomer.

Synthesis of Di-p-nitrophenyl ester of Polyglycol 250 Diacid (NPEG) monomer (FIG. 3). A solution of triethylamine (12.12 g, 0.12 mol) and p-nitrophenol (16.70 g, 0.12 mol) in 300 mL of acetone was added into a reaction flask with stir bar and a dropping funnel at 0° C. A solution of polyglycol 250 acid dichloride (15 g, 52.3 mmol) in 100 mL acetone was subsequently added drop wisely into the flask with rapidly stirring for 3 hrs at 0° C. (ice/water bath) and then kept stirring at room temperature overnight. The reaction mixture was precipitated into water and isolated by filtration. The crude product (NPEG) was purified by recrystallizing in ethyl acetate for 3 times, and dried in vacuo. Yield was 74%

Figure 4:
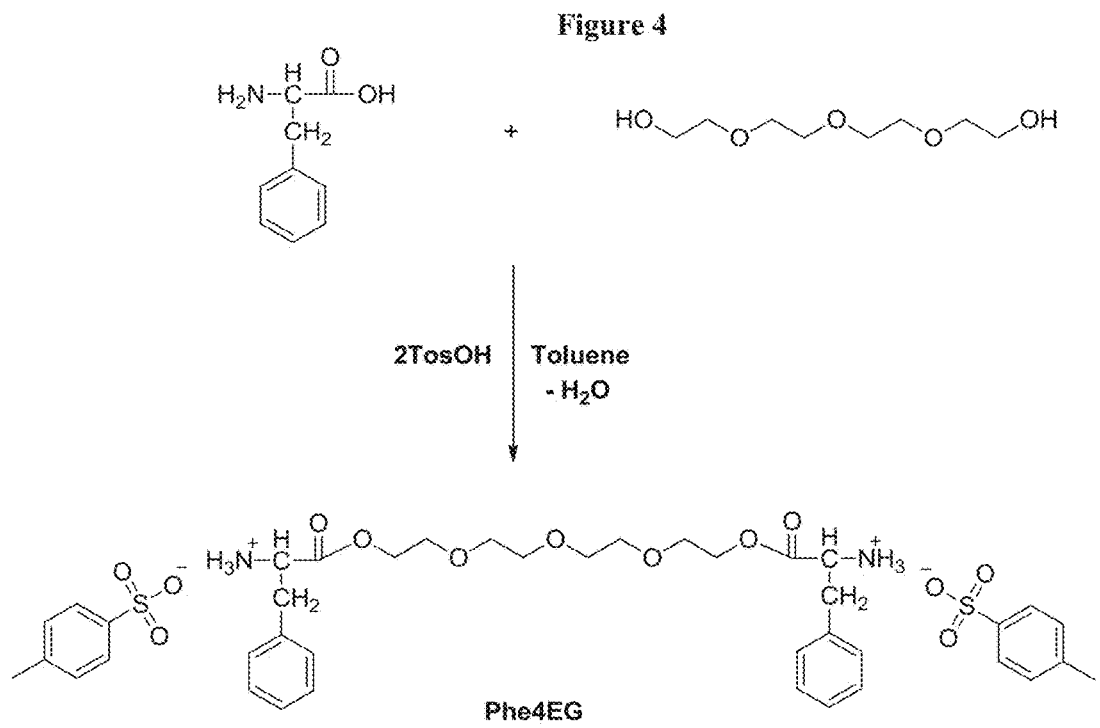
FIG. 4. Synthesis of Di-p-toluenesulfonic Acid Salts of Bis-L-phenylalanine Tetraethylene Glycol Ester (Phe4EG) monomer.

Synthesis of Di-p-toluenesulfonic Acid Salts of Bis-L-phenylalanine Tetraethylene Glycol Ester (Phe4EG) monomer (FIG. 4). L-phenylalanine (25.87 g, 0.176 mol), p-toluenesulfonic acid monohydrate (33.44 g, 0.176 mol) and tetraethylene glycol (15.54 g, 0.08 mol) in 300 mL of toluene were placed in a reaction flask with a Dean-Stark apparatus and stir bar. The solid-liquid reaction mixture was heated to reflux for 24 hrs and then cooled to room temperature. After the solvent was removed by evaporation, the crude product was purified by recrystallizing in isopropyl alcohol 3 times and dried in vacuo.

Synthesis of Macromer 1.1 intermediate and Macromer 1.2 from NPEG and Phe4EG (FIG. 1). FIG. 1 (Scheme 1) shows the synthesis of Macromer 1.1 intermediate from NPEG and Phe4EG. NPEG (4.643 g, $1.00 \times 10^{-2}$ mol) and Phe4EG (5.553 g, $6.67 \times 10^{-3}$ mol) were dissolved in DMA (4 g), and then triethylamine (2.2 g, $2.20 \times 10^{-2}$ mol) was added dropwise to the solution. The reaction mixture was heated to 80° C. for 24 hrs. The resulting macromer solution was subsequently cooled to room temperature and precipitated with cold ethyl acetate. The purification was performed by dissolving macromer in chloroform and then precipitating into ethyl acetate solution again. The macromer residue was dried in vacuo at 50° C., which yielded a brown sticky product. Yield was 65%.

FIG. 1 (Scheme 1) also shows the synthesis of Macromer 1.2. Allylamine (0.12 g, $2.16 \times 10^{-3}$ mol) in DMA (4 g) was added dropwise to a solution of macromer I (2.0 g, $1.08 \times 10^{-3}$ mol) in 8 g DMA. The reaction was kept at room temperature with stirring for 12 hrs. The purification procedure was the same as described in the preparation of macromer 1.1. The Macromer 1.2 was dried in vacuo at room temperature for 24 hrs. The final product was still sticky brown with a 73% yield.

Characterization

Figure 5:
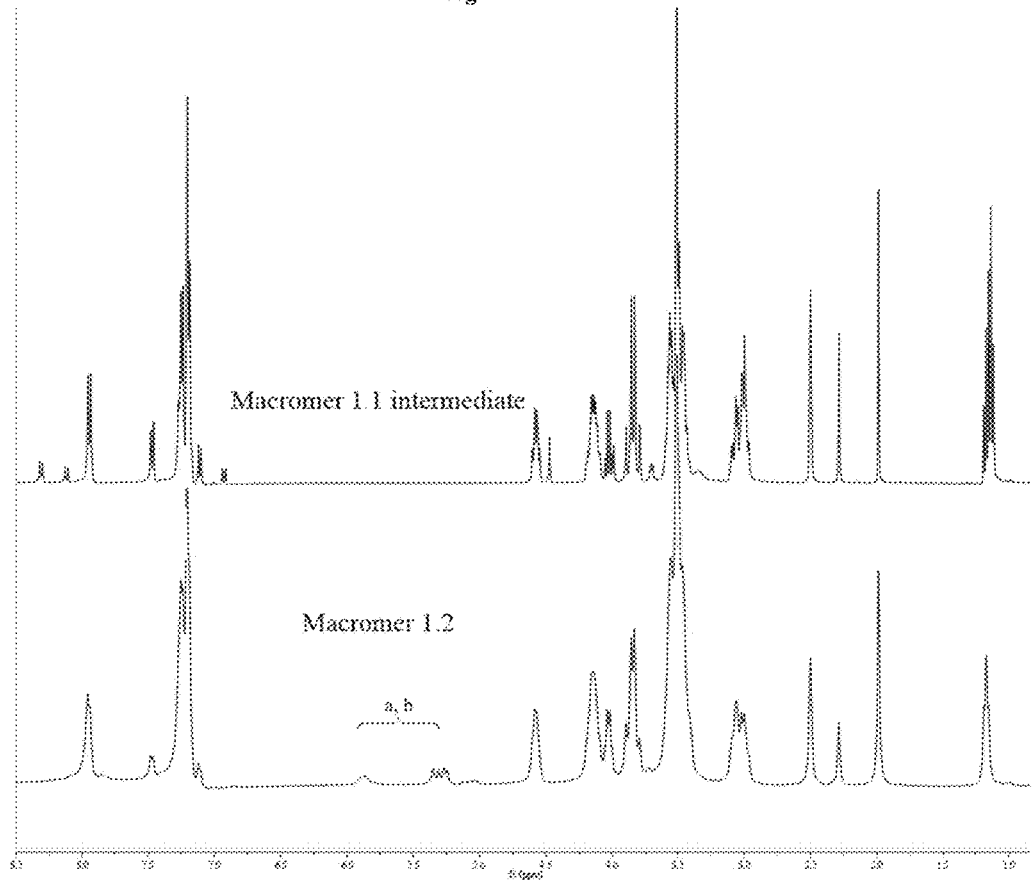
FIG. 5. $^1$H NMR spectra of Macromer 1.1 intermediate and Macromer 1.
Figure 5:
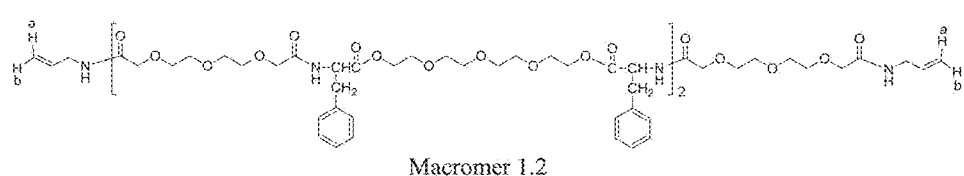

The $^1$H NMR spectrum (FIG. 5) for Macromer 1.2 showed two small peaks for the vinyl protons (—CH=$CH_2$) at δ 5.31 ppm and δ 5.87 ppm that were not found in the Macromer 1.1 intermediate. This result confirmed the chemical structure of Macromer 1.2 showed in Scheme 1. Solubility data are shown in Table 1.

TABLE 1

| | Solubility of Macromer 1.2 at room temperature (25° C.). | | | | | | | |
|---|---|---|---|---|---|---|---|---|
| | H$_2$O | DMF | DMSO | THF | Methanol | Ethyl acetate | Chloroform | Acetone |
| Macromer 1.2 | ± | + | + | + | + | − | + | ± |

+ soluble;
− insoluble;
± partially soluble or swelling

Example 2

Example of Preparation of Phe-Based Functional Macromer

Figure 6:
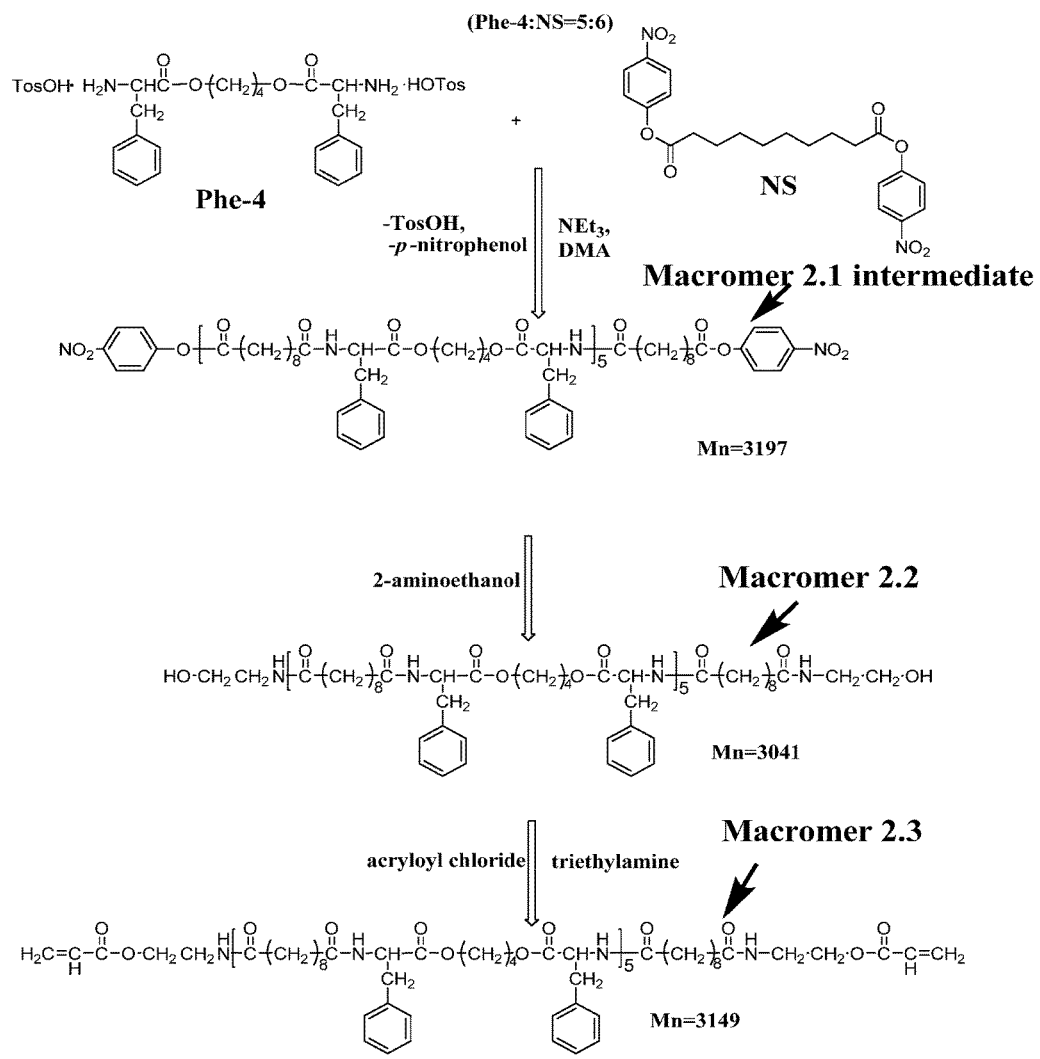
FIG. 6 (Scheme 2). Synthesis of Macromer 2.1 intermediate, Macromer 2.2 and Macromer 2.3.

A Phe-based functional macromer is provided. A method for synthesizing a Phe-based macromer is also provided. FIG. 6 (Scheme 2) shows an embodiment of the method for synthesizing Phe-based macromer in which Macromer 2.1 intermediate, Macromer 2.2 and Macromer 2.3 are synthesized. These Phe-based macromers differ from the Phe-EG-based functional Macromers 1.1 and 1.2 (above, Section 5.1.) in the diol unit. Steps of the Scheme 2 synthesis method are as follows.

Figure 7:
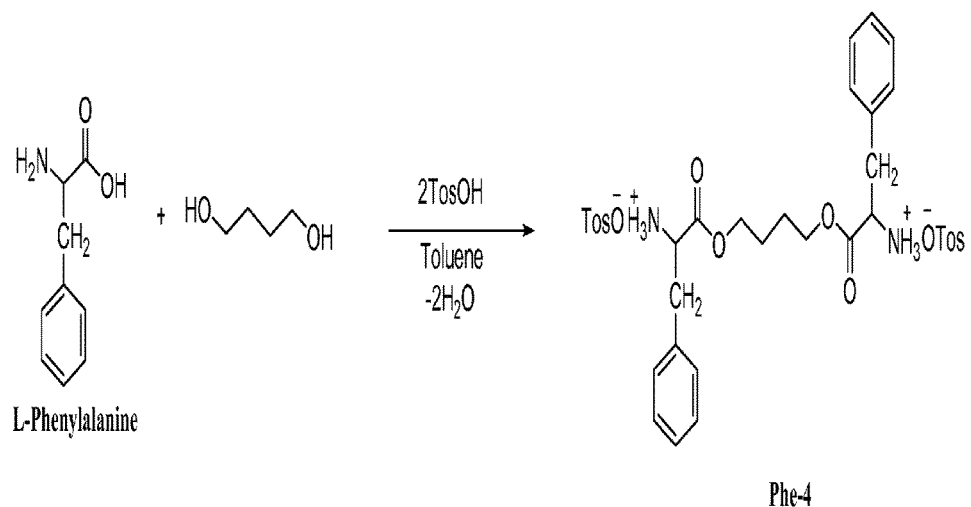
FIG. 7. Synthesis of Di-p-toluenesulfonic Acid Salt of Bis-L-phenylalanine Butane-1,4-diester Monomer (Phe-4).

Synthesis of Di-p-toluenesulfonic Acid Salt of Bis-L-phenylalanine Butane-1,4-diester Monomer (Phe-4) (FIG. 7). L-Phenylalanine (42.95 g, 0.26 mol) and 1,4-butanediol (10.80 g, 0.12 mol) were directly condensed in refluxed toluene (500 mL) with the presence of p-toluenesulfonic acid monohydrate (57.00 g, 0.30 mol). The heterogeneous solid-liquid reaction mixture was heated to 120° C. and reflux for 24 hours until 14.90 mL (0.83 mol) of water collected by Dean-Stark apparatus. The resulting reaction mixture was cooled down to room temperature. The precipitate was filtered on a Buchner funnel and then purified by recrystallizing three times in water, filtered again and dried in vacuo. Yield was 68%.

Figure 8:
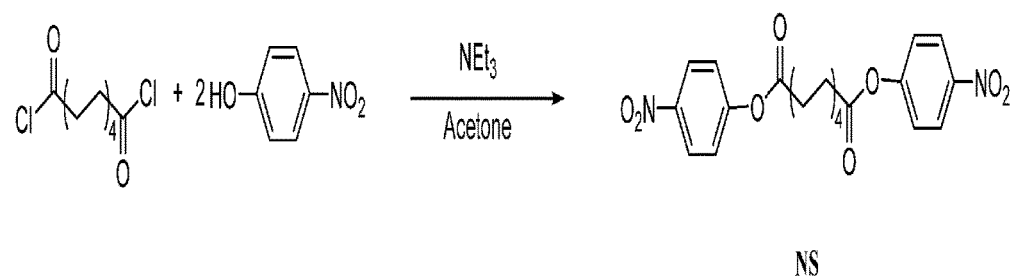
FIG. 8. Synthesis of Di-p-nitrophenyl Sebacate Monomer (NS).

Synthesis of Di-p-nitrophenyl Sebacate Monomer (NS) (FIG. 8). A solution of p-nitrophenol (43.00 g, 0.31 mol) and triethylamine (43.13 mL, 0.31 mol) dissolved in 500 mL acetone was placed in a single-neck round-bottom flask equipped with magnetic stirrer and a dropping funnel. The contents of the flask were kept at 0° C. by cooling with an ice/water mixture. Sebacoyl chloride (28.54 mL, 0.13 mol) in 100 mL of acetone was then added dropwise into the chilled solution with vigorously stirring for three hours and kept stirring at room temperature overnight. The resulting NS was precipitated in distilled water, dried in vacuum at room temperature and then purified by recrystallization from ethyl acetate three times. Yield was 75%.

Synthesis of Macromer 2.1 intermediate. NS (4.4420 g, $1.00 \times 10^{-2}$ mol) and Phe-4 (6.0740 g, $8.33 \times 10^{-3}$ mol) were dissolved in DMA (4 g), and then triethylamine (2.2 g, $2.20 \times 10^{-2}$ mol) was added dropwise to the solution. The reaction mixture was heated to 80° C. for 24 hrs. Subsequently, the resulting macromer solution was cooled to room temperature and precipitated with cold ethyl acetate. The purification was performed by dissolved macromer in chloroform and precipitated into ethyl acetate again. After removing ethyl acetate, the macromer residue was dried in vacuo at 50° C. with 71% yield. Macromer 2.1 is similar to Macromer 1.1, except conventional diols are used instead of oligoethylene glycol in Macromer 1.1.

TABLE 2.1

| | Solubility of Macromer 2.1 at room temperature (25° C.) | | | | | | | |
|---|---|---|---|---|---|---|---|---|
| | H$_2$O | DMF | DMSO | THF | Methanol | Ethyl acetate | Chloroform | Acetone |
| Macromer 2.1 | − | + | + | + | − | − | + | − |

+ soluble;
− insoluble.

Synthesis of Functional PEA macromer 2.2 with functional —OH group. 2-aminoethanol (0.15 g, $1.88 \times 10^{-3}$ mol) in DMA (4 g) was added dropwise to a solution of macromer 2.1 (3.0 g, $9.39 \times 10^{-4}$ mol) in 8 g DMA. The reaction was kept at room temperature with stirring for 12 hrs. The purification procedure was the same as described in preparation of macromer 2.1. The macromer 2.2 was dried in vacuo at 50° C. for 24 hrs. The final product yield was 68%.

TABLE 2.2

| | Solubility of Macromer 2.2 at room temperature (25° C.). | | | | | | | |
|---|---|---|---|---|---|---|---|---|
| | H$_2$O | DMF | DMSO | THF | Methanol | Ethyl acetate | Chloroform | Acetone |
| Macromer 2.2 | − | + | + | + | − | − | + | − |

+ soluble;
− insoluble.

Synthesis of Functional PEA macromer 2.3 with functional acryloyl (>C=C< bond) group. Freshly distilled acryloyl chloride (0.18 g, $1.97 \times 10^{-3}$ mol) in DMA (4 g) was added dropwise to a solution of Macromer 2.2 (1.5 g, $4.93 \times 10^4$ mol) in 8 g DMA. The reaction was kept at room temperature with stirring for 12 hrs. The purification procedure was the same as described in preparation of Macromer 2.1. Macromer 2.3 was dried in vacuo at room temperature for 24 hrs. The final product had a 65% yield.

TABLE 2.3

Solubility of Macromer 2.3 at room Temperature (25° C.).

| | $H_2O$ | DMF | DMSO | THF | Methanol | Ethyl acetate | Chloroform | Acetone |
|---|---|---|---|---|---|---|---|---|
| Macromer 2.3 | − | + | + | + | − | − | + | − |

+ soluble;
− insoluble.

Characterization

Figure 9:
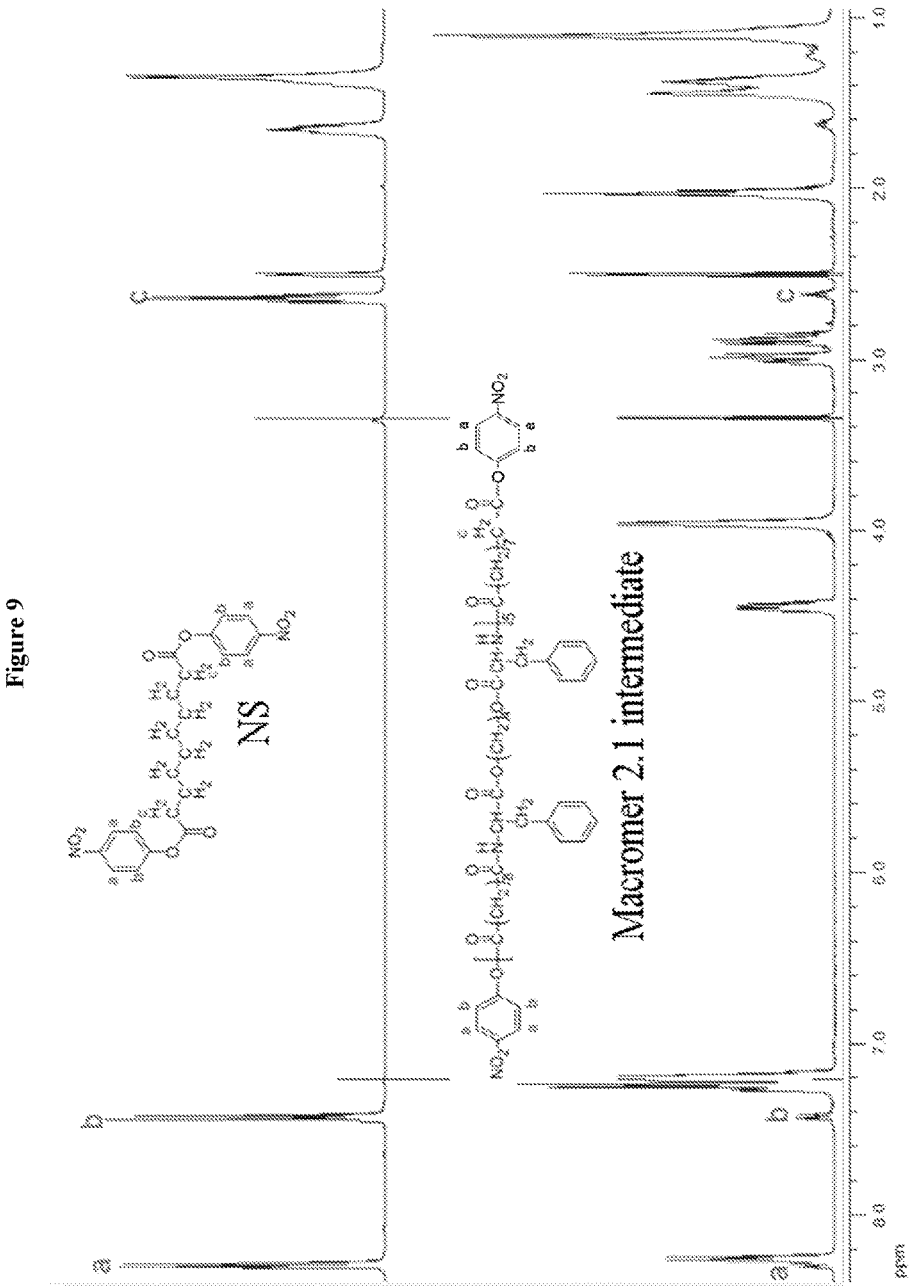
FIG. 9. $^1$H NMR spectra of NS, Macromer 2.1 intermediate, Macromer 2.2 and Macromer 2.3.
Figure 9:
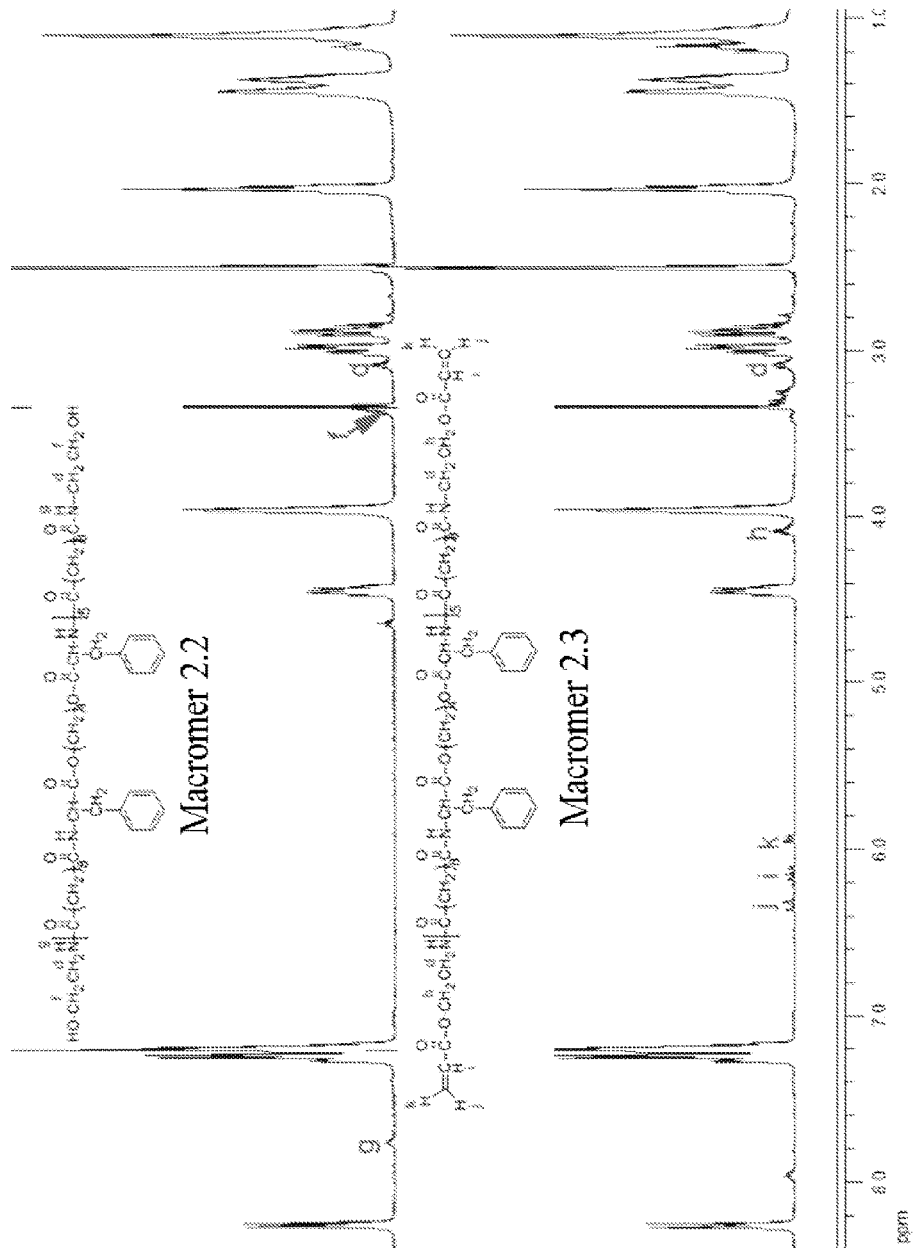

The chemical structure of the functional PEA macromers were characterized by standard NMR and FTIR methods. The $^1$H NMR spectrum for Macromer 2.3 (FIG. 9) showed three small peaks for the protons of the acryloyl end groups: δ 5.92 ppm, δ 6.31 ppm (—CH═CH$_2$) and δ 6.18 ppm (—CH═CH$_2$) that were not found in the Macromer 2.1 intermediate and Macromer 2.2. These results confirmed the chemical structure of Macromer 2.3 showed in Scheme 2.

Figure 10:
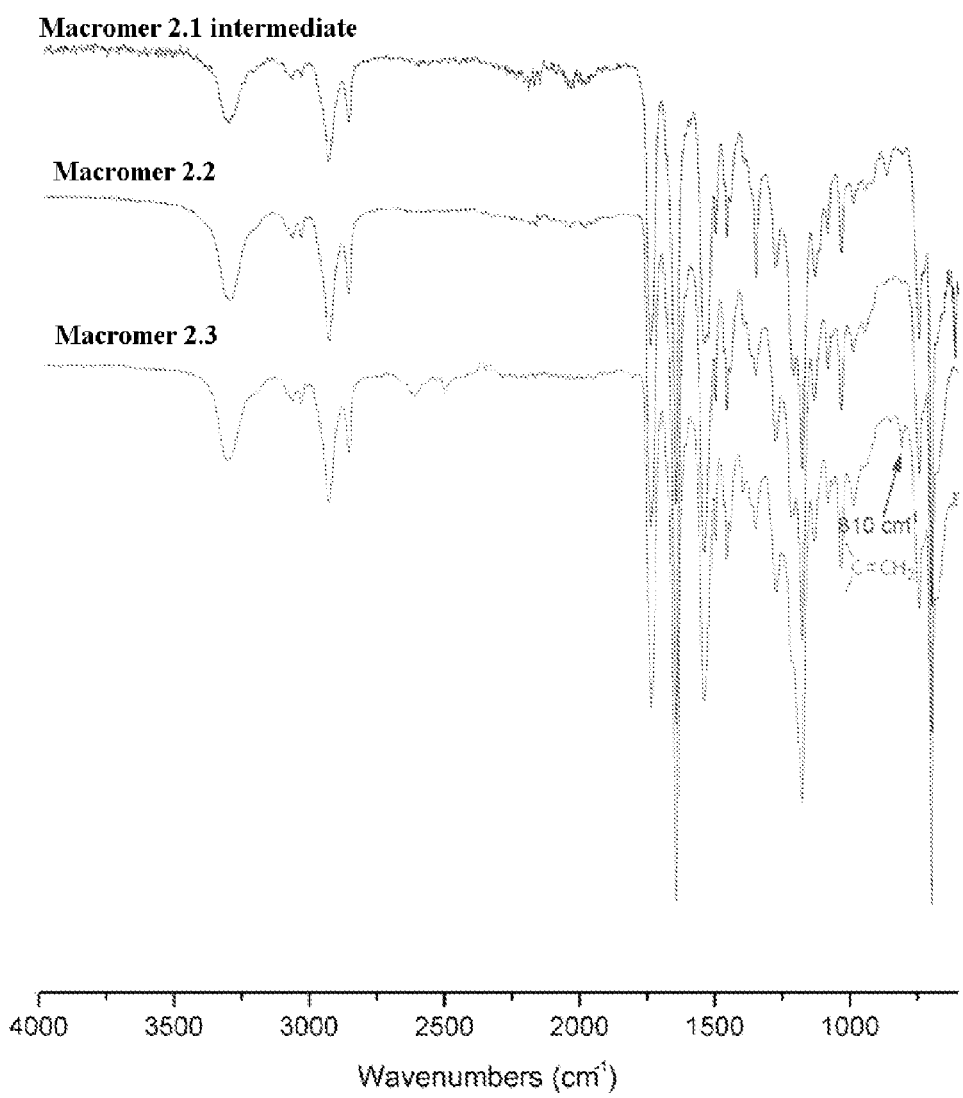
FIG. 10. FTIR spectra of Macromer 2.1 intermediate, Macromer 2.2 and Macromer 2.3. The >C=C< stretch of Macromer 2.3 at 1638 cm$^1$ has been overlapped, CH$_2$ of vinyl tag at 810 cm$^1$.

The characteristic absorption bands of >C═C< groups (FIG. 10) were observed at 810 cm−1. This result indicated that the hydroxyl end groups in Macromer 2.2 were converted to acryloyl groups in Macromer 2.3.

Figure 11:
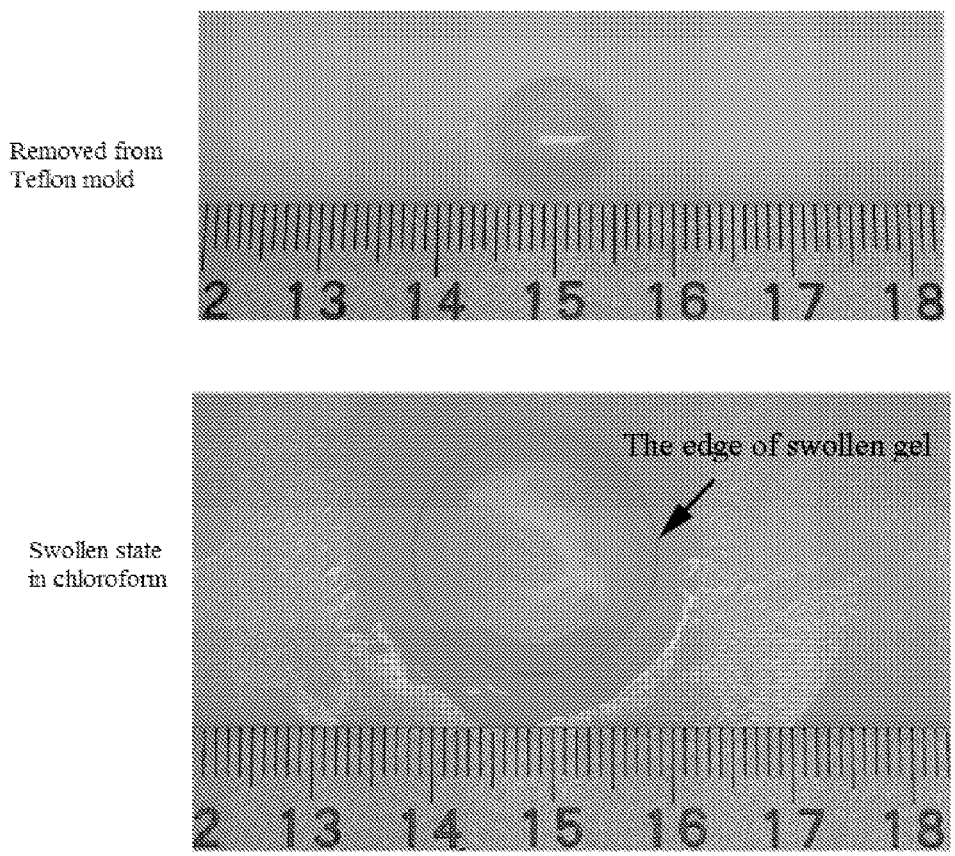
FIG. 11. Gel made from Macromer 2.3 (self-gelation without non-PEA component).

Hydrogel formation from Functional PEA macromer 2.3. An example of making a gel from functional PEA Macromer 2.3 is provided. 0.20 g of Macromer 2.3 was added to a vial and dissolved in 2 mL of DMSO to form a clear, homogeneous solution. Irgacure 2959 photoinitiator (0.02 g, 10 wt % of Macromer) was added into the Macromer solution 2.3. Subsequently, 0.50 mL of this precursor solution was transferred into Teflon mold (diameter=12 mm, depth=4.4 mm) and irradiated by a UV lamp (365 nm, 100 W) for 20 minutes. The resultant hydrogel was removed and swelled in chloroform for 24 hours. FIG. 11 shows the optical images of gels made from functional PEA macromer 2.3.

the method for synthesizing Macromer 4.1 intermediate and Macromer 4.2 according to one embodiment of the method.

Synthesis of Di-p-nitrophenyl Fumarate Monomer (NF).

Figure 15:
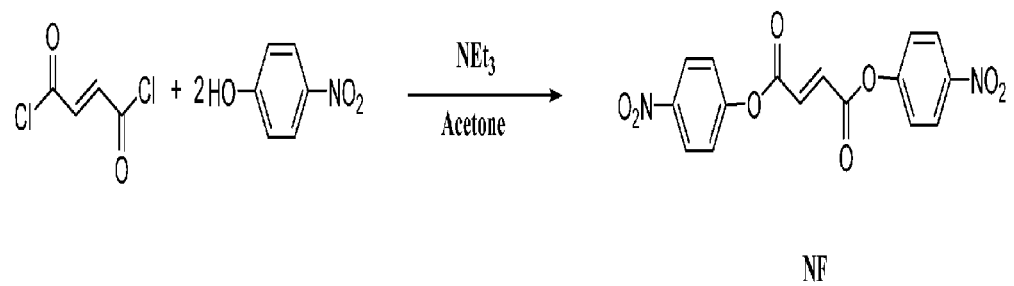
FIG. 15. Synthesis of Di-p-nitrophenyl Fumarate Monomer (NF).

FIG. 15 shows the synthesis of Di-p-nitrophenyl fumarate monomer (NF). A solution of triethylamine (6.09 g, 0.0603 mol) and p-nitrophenol (8.39 g, 0.0603 mol) in 100 mL of acetone was prepared at room temperature, and the solution was kept at −78° C. with dry ice and ethanol. Fumaryl chloride (3.2 mL, 0.03 mol) in 40 mL of acetone was added drop wisely into the chilled solution, and then with stirring at room temperature overnight. The resulting NF was precipitated in distilled water, dried in vacuum at room temperature and then purified by recrystallization from acetonitrile three times. The yield obtained was 82%.

Synthesis of Di-p-toluenesulfonic Acid Salt of Bis-L-phenylalanine Butane-1,4-diester Monomer (Phe-4). Di-p-toluenesulfonic Acid Salt of Bis-L-phenylalanine Butane-1,4-diester Monomer (Phe-4) was synthesized as described above for Phe-Based Macromer (in Section 5.2).

Synthesis of Macromer 4.1 intermediate from NF and Phe-4. NF (3.5820 g, 1.00×10$^{-2}$ mol) and Phe (4.8530 g, 6.67×10$^{-3}$ mol) were dissolved in DMA (4 g), and then triethylamine (2.2 g, 2.20×10$^{-2}$ mol) was added dropwise to the solution. The reaction mixture was heated to 80° C. for 24 hrs. Subsequently, the resulting macromer solution was cooled to room temperature and precipitated with cold ethyl acetate. The purification was performed by dissolved macromer in chloroform and precipitated into ethyl acetate again. After dumping the ethyl acetate, the macromer residue was dried in vacuo at 50° C., with a 67% yield.

TABLE 4.1

Solubility of Macromer 4.1 at room Temperature (25° C.).

| | $H_2O$ | DMF | DMSO | THF | Methanol | Ethyl acetate | Chloroform | Acetone |
|---|---|---|---|---|---|---|---|---|
| Macromer 4.1 | − | + | + | − | − | − | ± | − |

+ soluble;
− insoluble;
± partially soluble or swelling

Example 3

Figure 14:
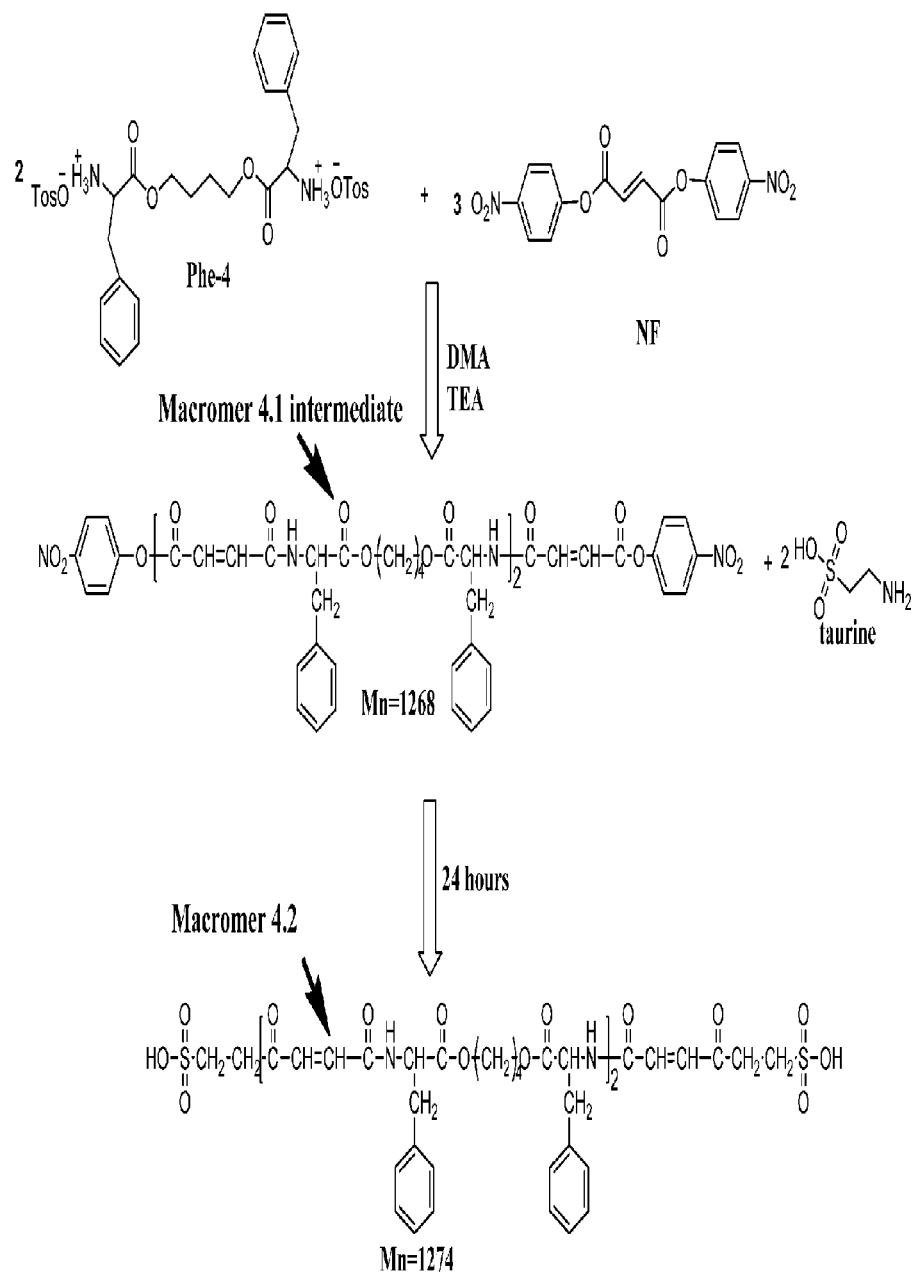
FIG. 14 (Scheme 4). Synthesis of Macromer 4.1 and Macromer 4.2.

Example of Preparation of Sulfonic Acid-Terminated Unsaturated Functional PEA Macromer A sulfonic acid-terminated unsaturated functional PEA macromer is provided. A method for synthesizing a sulfonic acid-terminated unsaturated functional PEA macromer is also provided. FIG. 14 (Scheme 4) shows an embodiment of Synthesis of Macromer 4.2. Taurine (0.40 g, 3.15×10$^{-3}$ mol) was added dropwise to a solution of macromer 4.1 (2.0 g, 1.57×10$^{-3}$ mol) in 8 g DMA. The reaction was maintained at 80° C. with stirring for 12 hrs. The purification procedure was the same as described above for the preparation of Macromer 4.1 intermediate. Macromer 4.2 was dried in vacuo at 50° C. for 24 hrs. The final product yield was 63%.

TABLE 4.2

Solubility of Macromer 4.2 at room Temperature (25° C.)

|  | H$_2$O | DMF | DMSO | THF | Methanol | Ethyl acetate | Chloroform | Acetone |
|---|---|---|---|---|---|---|---|---|
| Macromer 4.2 | − | + | + | − | − | − | ± | − |

+ soluble;
− insoluble;
± partially soluble or swelling

Characterization

FIG. 16 shows the 1H NMR spectra of Macromer 4.1 intermediate and Macromer 4.2. The new peaks at δ 3.53 ppm (—CH$_2$—CH$_2$—SO$_3$H) (b) and at δ 3.72 ppm (—CH$_2$—CH$_2$—SO$_3$H) (a) in the 1H NMR spectrum of Macromer 4.2 were attributed to the protons of methylene groups next to the sulfonic acid end groups.

Gel formation from Functional PEA macromer 4.2. In one embodiment, a hybrid gel can be synthesized from functional PEA macromer 4.2 and PEG-DA. A weight percentage ratio of 20/80 Macromer 4.2/PEG-750 diacrylate (0.04 g of Macromer 4.2 and 0.16 g of PEG-750 diacrylate) was added to a vial and dissolved in 2 mL of DMSO to form a clear, homogeneous solution. A gel solution was made by adding the Irgacure 2959 photoinitiator (0.02 g, 10 wt % of precursors) into the solution of precursors. Subsequently, 0.50 mL gel solution was poured into Teflon mold (diameter=12 mm, deepness=4.4 mm) and irradiated by a UV lamp (365 nm, 100 W) for 20 minutes. The resultant hydrogel (with remaining residual DMSO solvent) was removed and swelled in water for 2 hours. FIG. 17 shows optical images of such a hybrid gel before and after swelling. The hybrid gel of FIG. 17 was made from sulfonic acid-terminated unsaturated functional PEA Macromer 4.2 and PEG-750 diacrylate. (a: after removal from mold, b: after 2 hrs in water).

Gel formation from Functional PEA macromer 4.2. A hybrid gel can be synthesized from functional PEA macromer 4.2 and PEG-DA. A weight percentage ratio of 20/80 Macromer 4.2/PEG-750 diacrylate (0.04 g of Macromer 4.2 and 0.16 g of PEG-750 diacrylate) was added to a vial and dissolved in 2 mL of DMSO to form a clear, homogeneous solution. A gel solution was made by adding the Irgacure 2959 photoinitiator (0.02 g, 10 wt % of precursors) into the solution of precursors. Subsequently, 0.50 mL gel solution was poured into Teflon mold (diameter=12 mm, deepness=4.4 mm) and irradiated by a UV lamp (365 nm, 100 W) for 20 minutes. The resultant hydrogel (with remaining residual DMSO solvent) was removed and swelled in water for 2 hours. FIG. 17 shows optical images of such a hybrid gel before and after swelling. The hybrid gel of FIG. 17 was made from sulfonic acid-terminated unsaturated functional PEA Macromer 4.2 and PEG-750 diacrylate. (a: after removal from mold, b: after 2 hrs in water).

Example 4

Example of Preparation Arg-Based Macromer 5.3 with Functional Double Bond End Groups An Arg-based macromer 5.3 with functional double bond end groups is provided (FIG. 18). A method for synthesizing an Arg-Based Macromer 5.3 with functional double bond end groups is also provided. FIG. 18 (Scheme 5) shows an embodiment of the method in which Macromer 5.1 intermediate, Macromer 5.2 and Macromer 5.3 are synthesized. In one embodiment, the steps of the method are as follows.

Synthesis of Di-p-toluenesulfonic Acid Salt of Bis-L-arginine Butane-1,4-diester Monomer (Arg-4-S) (FIG. 19). FIG. 19 shows one embodiment of the method for synthesizing Di-p-toluenesulfonic Acid Salt of Bis-L-arginine Butane-1,4-diester Monomer (Arg-4-S) (FIG. 19). L-arginine (45.29 g, 0.26 mol) and 1,4-butanediol (10.80 g, 0.12 mol) were directly condensed in refluxed toluene (500 mL) with the presence of p-toluenesulfonic acid monohydrate (114.00 g, 0.60 mol). The heterogeneous solid-liquid reaction mixture was heated to 120° C. and reflux for 24 hrs. The resulting reaction mixture was cooled down to room temperature. The toluene was removed, and the crude product was recrystallized from isopropyl alcohol for three times before dried in vacuo. Yield was 90%.

Synthesis of Macromer 5.1 intermediate (8-Arg-4 NP). NS (4.4420 g, 1.00×10$^{-2}$ mol) and Arg-4-S (8.1850 g, 7.5×10$^{-3}$ mol) were dissolved in DMSO (4 g), and then triethylamine (2.2 g, 2.20×10$^{-2}$ mol) was added dropwise to the solution. The reaction mixture was heated to 80° C. for 24 hrs. Subsequently, the resulting macromer solution was cooled to room temperature and precipitated with cold ethyl acetate. The purification was performed by dissolved macromer in methanol and precipitated into ethyl acetate again. After dumping the ethyl acetate, the macromer residue was dried in vacuo at 50° C., yielded a brown sticky product, with a 78% yield.

TABLE 5.1

Solubility of Macromer 5.1 at room Temperature (25° C.)

| | H$_2$O | DMF | DMSO | THF | Methanol | Ethyl acetate | Chloroform | Acetone |
|---|---|---|---|---|---|---|---|---|
| Macromer 5.1 | ± | + | + | − | + | − | − | − |

+ soluble;
− insoluble;
± partially soluble or swelling

Synthesis of Macromer 5.2. 2-aminoethanol (0.12 g, 1.87×10$^{-3}$ mol) in DMSO (4 g) was added dropwise to a solution of macromer I (3.0 g, 9.37×10$^{-4}$ mol) in 8 g DMSO. The reaction was kept at room temperature with stirring for 12 hrs. The purification procedure was the same as described in preparation of macromer 5.1 intermediate. Macromer 5.2 was dried in vacuo at 50° C. for 24 hrs. The final product yield was 77%.

TABLE 5.2

Solubility of Macromer 5.2 at room Temperature (25° C.)

| | H$_2$O | DMF | DMSO | THF | Methanol | Ethyl acetate | Chloroform | Acetone |
|---|---|---|---|---|---|---|---|---|
| Macromer 5.2 | ± | + | + | − | + | − | − | − |

+ soluble;
− insoluble;
± partially soluble or swelling

Synthesis of Macromer 5.3. Fresh distilled acryloyl chloride (0.18 g, 1.97×10$^{-3}$ mol) in DMF (4 g) was added dropwise to a solution of macromer 5.2 (1.5 g, 4.93×10$^{-4}$ mol) in 8 g DMF. The reaction was kept at room temperature with stirring for 12 hrs. The purification procedure was the same as described in preparation of macromer I. Macromer 5.3 was dried in vacuo at room temperature for 24 hrs. The final product yield was 73%.

TABLE 5.3

Solubility of Macromer 5.3 at room Temperature (25° C.).

| | H$_2$O | DMF | DMSO | THF | Methanol | Ethyl acetate | Chloroform | Acetone |
|---|---|---|---|---|---|---|---|---|
| Macromer 5.3 | ± | + | + | − | + | − | − | − |

+ soluble;
− insoluble;
± partially soluble or swelling

Example 5

Example of Preparation Arg-Based Macromer 6.2 with Functional Double Bond End Groups Arg-Based Macromers 6.2 with functional double bond end groups are provided (FIG. 20). A method for synthesizing Arg-Based Macromers with functional double bond end groups is also provided. Scheme 6 (FIG. 20) shows one embodiment of the method, in which Macromer 6.1 intermediate and Macromer 6.2 are synthesized.

Macromers 5.3 and 6.2 have similar chemical structures. However, Macromer 5.3 was synthesized from Macromer 5.1, which has nitrophenol end groups. The starting macromer for Macromer 6.2 was synthesized from Macromer 6.1 which has amine end groups.

Synthesis of Macromer 6.1 intermediate. Arg-4-S (10.9130 g, 1×10$^{-2}$ mol) and NS (2.9610 g, 6.67×10$^{-3}$ mol) were dissolved in DMSO (4 g), and then triethylamine (2.2 g, 2.20×10$^{-2}$ mol) was added dropwise to the solution. The reaction mixture was heated to 80° C. for 24 hrs. The resulting macromer solution was cooled to room temperature and precipitated with cold ethyl acetate. The purification was performed by dissolved macromer in methanol and precipitated into ethyl acetate again. After removing the ethyl acetate, the macromer residue was dried in vacuo at 50° C., which yielded a brown sticky product. Yield was 5%.

TABLE 6.1

Solubility of Macromer 6.1 at room Temperature (25° C.).

| | $H_2O$ | DMF | DMSO | THF | Methanol | Ethyl acetate | Chloroform | Acetone |
|---|---|---|---|---|---|---|---|---|
| Macromer 6.1 | ± | + | + | − | + | − | − | − |

+ soluble;

− insoluble;

± partially soluble or swelling

Synthesis of Macromer 6.2. NA (0.26 g, $1.33 \times 10^{-3}$ mol) was added dropwise to a solution of macromer I (2.0 g, $6.67 \times 10^{-4}$ mol) in 8 g DMSO. The reaction was kept at room temperature with stirring for 12 hrs. The purification procedure was the same as described in preparation of Arg-based macromer 6.1 intermediate. Arg-based macromer 6.2 was dried in vacuo at room temperature for 24 hrs. The final product yield was 73%.

TABLE 6.2

Solubility of Macromer 6.2 at Room Temperature (25° C.).

| | $H_2O$ | DMF | DMSO | THF | Methanol | Ethyl acetate | Chloroform | Acetone |
|---|---|---|---|---|---|---|---|---|
| Macromer 6.2 | ± | + | + | − | + | − | − | − |

+ soluble;

− insoluble;

± partially soluble or swelling

Characterization

FIG. 21 shows the $^1$H NMR spectrum for Macromer 6.2. The spectrum shows three small peaks for the protons of the acryloyl end groups at δ 5.65 ppm, δ 6.38 ppm (—CH=CH$_2$) and δ 6.12 ppm (—CH=CH$_2$).

Example 6

Example of Preparation Arg-Based Macromer 7.2 with Functional Double Bond End Groups An Arg-Based Macromer 7.2 with functional double bond end groups is provided. A method for synthesizing an Arg-Based Macromer 7.2 with functional double bond end groups is also provided. Scheme 7 (FIG. 22) shows an embodiment of the method wherein Macromer 7.1 intermediate and Macromer 7.2 are synthesized.

Synthesis of Macromer 7.1 intermediate (8-Arg-4 NP). NS (4.4420 g, $1.00 \times 10^{-2}$ mol) and Arg-4-S (7.27 g, $6.67 \times 10^{-3}$ mol) were dissolved in DMSO (4 g), and then triethylamine (2.2 g, $2.20 \times 10^{-2}$ mol) was added dropwise to the solution. The reaction mixture was heated to 80° C. for 24 hrs. Subsequently, the resulting macromer solution was cooled to room temperature and precipitated with cold ethyl acetate. The purification was performed by dissolving macromer in methanol and precipitating into ethyl acetate again. After discarding the ethyl acetate, the macromer residue was dried in vacuo at 50° C., yielded a brown sticky product in 76% yield.

TABLE 7.1

Solubility of Macromer 7.1 at room Temperature (25° C.).

| | $H_2O$ | DMF | DMSO | THF | Methanol | Ethyl acetate | Chloroform | Acetone |
|---|---|---|---|---|---|---|---|---|
| Macromer 7.1 | ± | + | + | − | + | − | − | − |

+ soluble;

− insoluble;

± partially soluble or swelling

Synthesis of Macromer 7.2. Allylamine (0.10 g, 1.82× $10^{-3}$ mol) in DMSO (4 g) was added dropwise to a solution of macromer I (2.0 g, 9.09×$10^{-4}$ mol) in 8 g DMSO. The reaction was kept at room temperature with stirring for 12 hrs. The purification procedure was the same as described in preparation of macromer I. The macromer II was dried in vacuo at room temperature for 24 hrs. The final product was in 73% yield.

TABLE 7.2

Solubility of Macromer 7.2 at room Temperature (25° C.).

| | H$_2$O | DMF | DMSO | THF | Methanol | Ethyl acetate | Chloroform | Acetone |
|---|---|---|---|---|---|---|---|---|
| Macromer 7.1 | ± | + | + | − | + | − | − | − |

+ soluble;
− insoluble;
± partially soluble or swelling

Characterization

The $^1$H NMR spectrum for Functional PEA macromer 6.2 (FIG. 23) showed three small peaks for the protons of the acryloyl end groups at δ 5.66 ppm, δ 6.38 ppm (—CH=CH$_2$) and δ 6.12 ppm (—CH=CH$_2$).

Gel formation from PEA function Macromer 7.2. An example of making hybrid gel from Macromer 7.2 and PEG-DA is given here. A weight percentage ratio of 20/80 Macromer 7.2/PEG-750 diacrylate (0.04 g of Macromer 7.2 and 0.16 g of PEG-750 diacrylate) was added to a vial and dissolved in 2 mL of DMSO to form a clear, homogeneous solution. The gel solution was made by adding Irgacure 2959 photoinitiator (0.02 g, 10 wt % of precursors) into the solution of precursors. Subsequently, 0.50 mL gel solution was added into Teflon module (diameter=12 mm, deepness=4.4 mm) and irradiated by a UV lamp (365 nm, 100 W) for 20 minutes.

Example 7

Example of Preparation of Functional Arg-Based Monomer

A functional Arg-based monomer is provided. A method for synthesizing a functional Arg-based monomer is also provided. Scheme 8 (FIG. 25) sets forth one embodiment of the method, in which Monomer 8.1 is synthesized. Monomer 8.1 is not a macromer, but a functional monomer with an active double bond at each of the two ends of the monomer.

Synthesis of Monomer 8.1. Arg-4-S (10.9130 g, 1×$10^{-2}$ mol) and NA (1.9300 g, 1×$10^{-2}$ mol) were dissolved in DMSO (4 g), and then triethylamine (2.2 g, 2.20×$10^{-2}$ mol) was added dropwise to the solution. The reaction mixture was heated to 80° C. for 24 hrs. The resulting macromer solution was cooled to room temperature and precipitated with cold ethyl acetate. The purification was performed by dissolving macromer in methanol and precipitating into ethyl acetate again. After discarding the ethyl acetate, the macromer residue was dried in vacuo at room temperature, yielding a brown sticky product at 73% yield.
Characterization The $^1$H NMR spectrum for Macromer 6.2 (FIG. 26) showed three small peaks for the protons of the acryloyl end groups at δ 5.62 ppm, δ 6.37 ppm (—CH=CH$_2$) and δ 6.12 ppm (—CH=CH$_2$).

This functional PEA monomer is very unusual owing to the two active double bonds at the two ends of the monomer. It can be used as a PEA-based cross-linker to make hydrogels from PEA-based or non-PEA-based precursors. It can also be used to make polymers via free radical polymerization of the functional PEA monomer.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A macromer having the following structure:

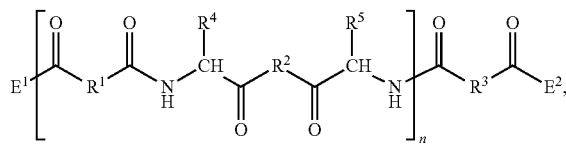

wherein R$^1$ at each occurrence in the macromer is independently selected from a C$_1$ to C$_{20}$ alkylene group, C$_2$ to C$_{20}$ alkenylene group, C$_1$ to C$_{20}$ alkylene diol group and C$_4$ to C$_{20}$ alkylene ether group, R$^2$ at each occurrence in the macromer are independently selected from a C$_1$ to C$_{20}$ alkylene diol group and C$_4$ to C$_{20}$ alkylene ether group, R$^3$ is selected from a C$_1$ to C$_{20}$ alkylene group, C$_2$ to C$_{20}$ alkenylene group, C$_2$ to C$_{20}$ alkylene diol group and C$_4$ to C$_{20}$ alkylene ether group, R$^4$ and R$^5$ at each occurrence in the macromer are independently a side-group of a naturally occurring amino acid or non-naturally occurring amino acid, E$^1$ and E$^2$ are each independently an end group selected from 1,4-nitrophenoxy group, —NH— alkenyl (C$_2$-C$_{10}$) group, —NH-alkynyl (C$_2$-C$_{10}$) group, —NH-alkyl (C$_2$-C$_{10}$) hydroxyl group, —NH-alkyl (C$_2$-C$_{10}$) amino group, —NH-alkyl (C$_2$-C$_{10}$) carboxyl group, and —NH-alkyl (C$_2$-C$_{10}$) halo substituted group, and n is an integer from 1 to 20.

2. The macromer of claim 1, wherein the macromer has the following structure:

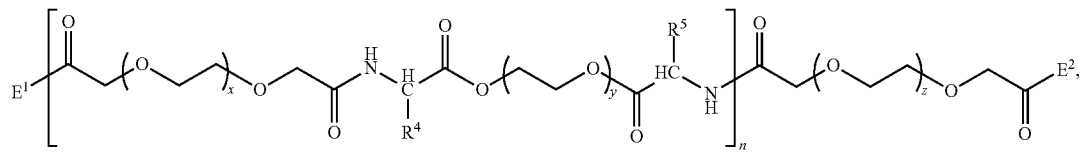

wherein x is an integer from 1 to 10,
y is an integer from 1 to 10,
z is an integer from 1 to 10.

3. A method for making a poly(ester amide) polymer comprising the steps of:

a) mixing a first macromer having the following structure:

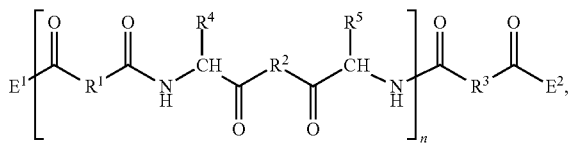

wherein $R^1$ at each occurrence in the macromer is independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^2$ at each occurrence in the macromer is independently selected from a $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^4$ and $R^5$ at each occurrence in the macromer are independently a side-group of a naturally occurring amino acid or a non-naturally occurring amino acid, $E^1$ and $E^2$ are each —NHCH$_2$COOH or an —NH-alkyl ($C_2$-$C_{10}$) COOH group, and n is an integer from 1 to 20, and a second macromer having the following structure:

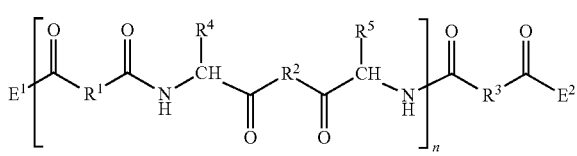

$R^1$ at each occurrence in the macromer is independently selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^2$ at each occurrence in the macromer is independently selected from a $C_1$ to $C_{20}$ alkylene diol group and $C_4$ to $C_{20}$ alkylene ether group, $R^3$ is selected from a $C_1$ to $C_{20}$ alkylene group, $C_2$ to $C_{20}$ alkenylene group, $C_1$ to $C_{20}$ alkylene diol group and $C_4$ to $C_{20}$ alkylene ether group, $R^4$ and $R^5$ at each occurrence in the macromer are independently a side-group of a naturally occurring amino acid or non-naturally occurring amino acid, $E^1$ and $E^2$ are each independently an end group selected from —NH— alkyl ($C_2$-$C_{10}$) hydroxyl group and —NH-alkyl ($C_2$-$C_{10}$) amino group, n is an integer from 1 to 20, in a ratio of first macromer:second macromer of 0.5:1 to 2:1, and optionally, a solvent; and b) mixing the mixture from a) with a dehydrating agent until polymerization has proceeded to the desired extent.

* * * * *